United States Patent
Hoelsaeter et al.

(10) Patent No.: US 7,855,938 B2
(45) Date of Patent: Dec. 21, 2010

(54) EXPANDABLE DATA STORAGE SYSTEM AND METHOD WITH CARTRIDGE PASS-THROUGH BETWEEN CARTRIDGE HANDLING UNITS

(75) Inventors: Håvard Hoelsaeter, Oslo (NO); Jan Erik Holter, Oslo (NO)

(73) Assignee: Tandberg Data ASA (NO)

( * ) Notice: Subject to any disclaimer, the term of this patent is extended or adjusted under 35 U.S.C. 154(b) by 733 days.

(21) Appl. No.: 11/858,989

(22) Filed: Sep. 21, 2007

(65) Prior Publication Data

US 2009/0083773 A1 Mar. 26, 2009

(51) Int. Cl.
*G11B 21/08* (2006.01)
(52) U.S. Cl. ...................................... 369/30.4
(58) Field of Classification Search ................. 369/30.4
See application file for complete search history.

(56) References Cited

U.S. PATENT DOCUMENTS

| | | | | |
|---|---|---|---|---|
| 5,828,646 | A * | 10/1998 | Jones | 369/30.4 |
| 5,999,356 | A * | 12/1999 | Dimitri et al. | 360/71 |
| 6,449,223 | B1 * | 9/2002 | Kanetsuku et al. | 369/30.41 |
| 6,498,771 | B1 * | 12/2002 | Boyce et al. | 369/30.34 |
| 6,574,641 | B1 * | 6/2003 | Dawson et al. | 1/1 |
| 6,621,655 | B2 * | 9/2003 | White et al. | 360/92.1 |
| 6,820,273 | B2 * | 11/2004 | Gardner et al. | 720/632 |
| 6,900,960 | B2 * | 5/2005 | Gariepy et al. | 360/92.1 |
| 7,057,847 | B2 * | 6/2006 | Reasoner et al. | 360/92.1 |
| 7,369,353 | B1 * | 5/2008 | Gupta et al. | 360/92.1 |
| 2004/0257924 | A1 * | 12/2004 | Studebaker et al. | 369/30.31 |
| 2005/0152061 | A1 * | 7/2005 | Hoelsaeter | 360/92 |

* cited by examiner

*Primary Examiner*—Mark Blouin
(74) *Attorney, Agent, or Firm*—Schiff Hardin LLP

(57) ABSTRACT

An apparatus and method for expanding capacity of a data cartridge storage and handling apparatus includes a modification to permit a second data cartridge storage and handling apparatus to be added to the system at a position to permit exchange of data cartridges via a pass-through opening. A pass-through box is added in one of the storage and handling units, the pass-through box having a portion shaped like a cartridge so that it is gripped by a gripper of a cartridge shuttle. A second part of the pass-through box holds a cartridge so that the shuttle can hold the pass-through box in a position to extend the cartridge it is holding into the other storage and handling apparatus. A marking system is provided to ensure proper spacing of the units from one another. A connection and control coordinates the operation thereof. The pass-through box is installed by being inserted in a replacement storage magazine. The housings of the storage and handling apparatus have a removable cover to permit opening of the pass-through opening.

20 Claims, 19 Drawing Sheets

EXPANDABLE DATA STORAGE SYSTEM AND METHOD WITH CARTRIDGE PASS-THROUGH BETWEEN CARTRIDGE HANDLING UNITS

BACKGROUND OF THE INVENTION

1. Field of the Invention

The present invention relates generally to an apparatus and method for handling and storing data cartridges, and in particular to a data cartridge handling apparatus and method that is selectively expandable to increase storage capacity.

2. Description of the Related Art

Data storage and handling devices, which are sometimes known as auto-loaders, are systems that include a cartridge read/write drive for writing data to a cartridge and for reading the data from the drive. The data storage and handling devices typically also include one or two cartridge storage magazines that have spaces in which data cartridges that are used by the read/write drive are stored when not in use. A robotic cartridge moving apparatus, also referred to as a cartridge shuttle, is provided for moving the cartridges from the storage magazine to the read/write drive and back again as needed. A power supply and control apparatus are also provided. The data storage and handling device is contained within a housing, such as a standard size, rack-mountable housing.

The demand for data storage capacity for computer systems is constantly increasing. To address the increasing demand, new and larger data backup and archive systems are needed. However, the larger backup and storage systems are expensive to purchase for the user and expensive to manufacture and develop for the manufacturer. If a user has a growing need for higher data storage capacity, it would be a better solution to provide a smaller data storage system to meet present needs that at a later stage can be expanded into a bigger system to meet the greater future needs. One such approach is to provide a data storage system that can be built together for form a bigger system in order to follow the user's growing needs. In this way, the initial investment by the user in the smaller data storage system would not be lost and the additional investment by the user in the expanded data storage system would follow the increased user needs for increased data archive.

There are some data storage systems today that offer the possibility of expanding capacity, but the upgrade is expensive and in some cases involves providing an additional robotic cartridge handling apparatus or mechanism to pass the data cartridges between one or more vertical storage units. Furthermore, some of the expanded capacity systems are physically linked together as a whole, which makes them difficult to ship, handle and install.

SUMMARY OF THE INVENTION

The present invention provides an apparatus and method for selectively expanding data storage capacity by providing a data storage unit that is readily modified for mounting with one or more further data storage units so as to permit data cartridges to be passed from one data storage unit to another. In particular, the data storage unit may be modified easily for providing pass-through capability to exchange data cartridges with other data storage units, This is accomplished in embodiments by providing cooperating pass-though openings in the data storage units and by including a pass-through box as a simple modification to a data cartridge handling apparatus in at least one of the data storage units to pass data cartridges through the pass-though openings to a data handling apparatus in the other data storage unit. The data cartridges are thereby passed from one data storage unit to another of the data storage units. The data cartridge handling and storage units operate normally apart from being able to pass the cartridges from one data storage unit to another.

The data storage units may be readily modified by a user, by the manufacturer or by others to accommodate the pass-through capability. More storage units having pass-through capability may be added as needed, thereby enabling changes in the data storage capacity without removal and replacement of existing equipment. It is also foreseen to permit reduction, either temporarily or permanently, in the storage capacity as needed by removal of the further data storage units. Such reduction may be the result of the use of higher capacity data cartridges, for example. The reduction may also permit servicing of a portion of the data storage system without removing the entire data storage system from service.

A general principle of the present apparatus and method is to connect two or more data cartridge handling and storage units together, making a larger system with an increased capacity in which it is possible that all of the cartridges in the system may be transferred to any location within the new combined system.

According to one principle, the present apparatus includes a data cartridge handling and storage unit of a type that is known and further includes, in a preferred embodiment, four features to permit expansion of the data cartridge handling and storage unit by addition of another data cartridge handling and storage unit.

A first feature of the preferred embodiment is that a pass-through box is provided, the pass-though box has a compartment to hold a data cartridge to be transferred from one data cartridge handling and storage unit to the other data cartridge handling and storage unit. The data cartridge which is being passed from one unit to another by the pass-through box may be referred to as a pass-through cartridge. In the preferred embodiment, the compartment to hold the pass-through cartridge is an upper portion or compartment of the pass-through box. The pass-through box has another portion formed in a shape of a standard cartridge housing. In the preferred embodiment, a lower portion of the pass-through box is shaped like a standard data cartridge. As such, the lower portion of the pass-through box fits into a cartridge handling shuttle thereby providing a vertical extension to the cartridge handling shuttle to permit the shuttle to move the cartridge upward sufficiently to pass into a storage and handling unit mounted above the unit in which the shuttle is located.

The upper compartment of the pass-through box includes an apparatus for selectively ejecting a cartridge from the upper compartment. In one embodiment, the cartridge ejection is accomplished by a spring-loaded eject arm that pushes the cartridge from the pass-through box when the cartridge is not restrained in the compartment and by a securing apparatus, such as a hook at the side of the compartment, to secure the cartridge in the compartment of the pass-through box and selectively release the cartridge to permit the eject arm to push the cartridge out. The cartridge may thereby ejected while the upper compartment is in the storage and handling unit above the unit in which the shuttle is located, where the cartridge may be grasped by a cartridge shuttle in the upper unit.

A second feature of the preferred embodiment is a special cartridge storage magazine for the data cartridge handling and storage unit. The handling and storage unit has one or more magazine with slots into which are stored the data cartridges. The special magazine has a slot for holding the pass-through box. The preferred cartridge storage magazine includes a plurality of cartridge slots for storing data cartridges and a pass-through box slot which holds the movable pass-through box. The magazine also preferably may hold the pass-though box with a cartridge in the box and while the box receives and ejects.

As an alternate embodiment, the pass-through box is stored in a location in the data cartridge handling and storage unit that is not in the data cartridge magazine. The storage location can be a fixed storage apparatus in the data cartridge handling and storage unit, such as a predetermined location in the housing, at which the pass-through box is to be stored.

A third feature of the preferred embodiment provides an apparatus for correct positioning of the data cartridge handling and storage units relative to one another. In one embodiment, a stencil tape or other marking device is put onto a mounting rack on which is to be mounted the data cartridge handling and storage units, the stencil tape or other marking device having marks to indicate the mounting location of data cartridge handling and storage units relative to one another on the mounting rails in order to achieve the correct vertical physical spacing of the units. Even if a plurality of the handling and storage units are to be combined into a larger system, the individual handling and storage units are mounted on the rack separately and do not need to be physically connected together before being mounted into the rack.

A fourth aspect of the preferred embodiment is that control software is provided that combines the operation of the plural units to operate as a single logical unit. The control software operates through a physical electrical connection to the units that can for example be provided by an Ethernet or other network connection of the cartridge handling and storage units to a common hub or network, or by directly connecting the units together by cable, for example.

In order to accomplish a pass-through of a cartridge between two handling and storage units that stacked one on the other and are configured as a combined system, the robotic cartridge shuttle in the lower unit the engages the pass-through box by engaging the cartridge shaped portion thereof, a cartridge is loaded into the pass-through box, and the robotic shuttle moves the pass-through box with the cartridge up or down so that the cartridge in the pass-through box is physically accessible for the robotic shuttle in the adjacent handling and storage unit. The movement of the cartridge with the pass-through box is done by using the robotics and elevators mechanisms of the cartridge shuttles that are already provided in the units.

Any number of storage and handling units may be linked together in this way to provide an expanded capacity system. There are no theoretical physical limitations to how many single units which can be connected together to form the new combined system. The uppermost storage and handling unit does not need to have the special magazine with a pass-through box. Otherwise, all of the single units in the combined system have the special magazine with the pass-through box included.

There needs to be an opening in the top and/or bottom of each of the units of the combined system in order to permit movement of a cartridge from one unit to the other. This opening may be provided by providing openable covers for the storage and handling apparatus, by providing replacement covers for the storage and handling apparatus, or by removing the cover altogether and possible including a new cover of a size to enclose the units of the combined system. When the housing of the units is provided with an opening, on the upper-most storage and handling unit the hole is covered on the top, and on the lower-most unit the hole is covered at the bottom. For the units in between, the hole in the housing is open at both the top and the bottom section of the respective unit.

The preferred embodiments provide a low cost apparatus and method for expanding the storage capacity of a data storage system which requires few additional moving parts, and is easily installed by a user or by service personnel.

DETAILED DESCRIPTION OF THE PREFERRED EMBODIMENTS

Figure 1:
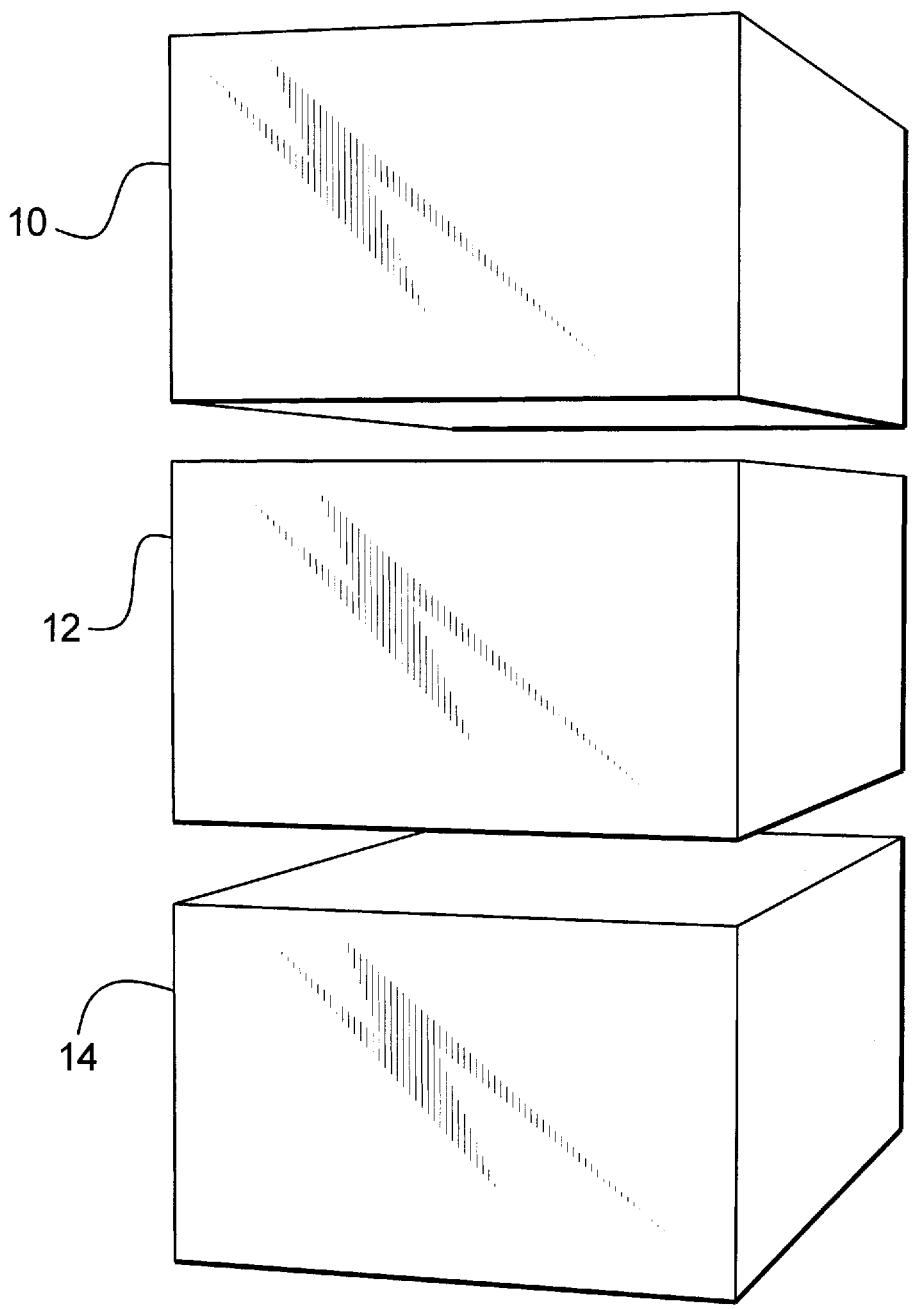
FIG. 1 is schematic diagram of three cartridge handling and storage units mounted in a stacked configuration to permit pass-through of a cartridge from one unit to another.

In FIG. 1, three cartridge handling and storage units 10, 12 and 14 are shown in a stacked configuration. The cartridge handling and storage units 10, 12 and 14, which in some configurations are referred to as autoloaders, are able to pass data storage cartridges from one unit to the other. The cartridges are passed in a vertical direction by units that are adjacent one another; for example, unit 10 can pass a cartridge to unit 12 or vise versa and unit 12 can pass a cartridge to unit 14 or vise versa, but for a cartridge to be passed between units 10 and 14 requires that the intermediary unit 12 be involved.

The vertical arrangement of the cartridge handling and storage units 10, 12 and 14 is usually accomplished by mounting the units on a rack, such as a computer network equipment rack. Such racks enable equipment of standard sizes, such as patch panels, switches and other rack mountable network equipment to be mounted in a position for easy access and connection to other equipment. The racks may either be a two post rack or a four post rack. By utilizing the already present standard rack to mount the handling and storage units 10, 12 and 14 in the cartridge passing configuration, the present invention simplifies changing capacity of data storage systems. Further, by permitting capacity to be changed by adding one or more units to existing systems rather than by replacing existing systems, the investment in the existing system is preserved.

Figure 2:
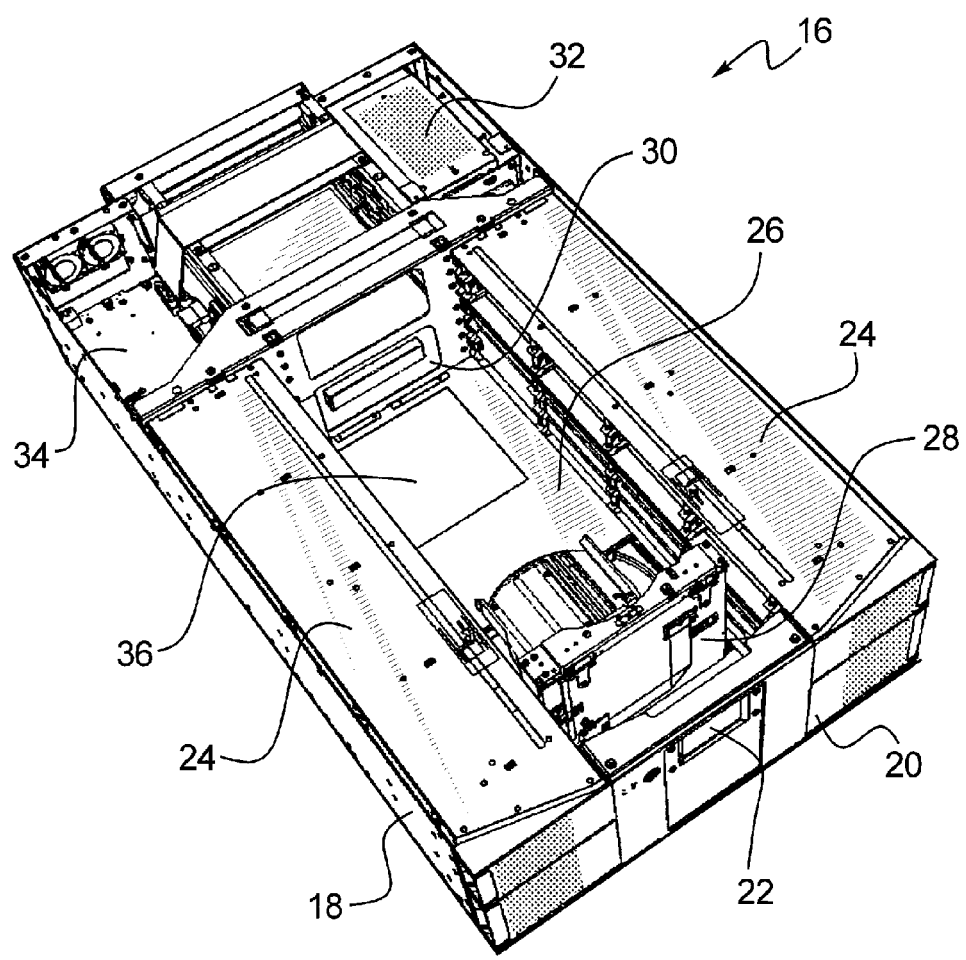
FIG. 2 is top perspective view of a cartridge handling and storage unit shown with the top cover removed and with a removable panel for effecting pass through of a cartridge.

Turning to FIG. 2, a cartridge storage and handling apparatus, or autoloader, 16 is provided. The cartridge storage and handling apparatus 16 includes a chassis 18 with a front panel 20 on which are provided displays and controls 22. A housing ordinarily encloses the cartridge storage and handling apparatus 16 but the autoloader unit is shown without the housing in order to show interior components thereof. Inside the cartridge storage and handling apparatus 16 are two storage magazines 24 that have slots in which data storage cartridges may be stored. The magazines 24 of the preferred embodiment have rows and columns of storages slots, and the number of rows and columns may vary depending on storage capacity of the unit. Of course, the cartridge storage and handling apparatus 16 may have only one storage magazine 24 or may have more than two magazines. The storage magazines 24 are removable by a user to permit loading and unloading of data storage cartridges from the unit. A single cartridge loading slot may be provided such as on the front panel 20 as desired.

The storage magazine 24 are arranged spaced from one another by a central channel 26 and a robotic cartridge shuttle 28 is provided in the channel 26. A cartridge read/write drive 30 is provided at the end of the channel 26. In some embodiments, two or more read/write drives are provided in the storage and handling apparatus. The shuttle 28 is operable to remove data cartridges from slots in the storage magazines 24 and provide the cartridges to the drive 30 where data is written to the cartridge or read from the cartridge, or both, as desired. When the drive 30 has completed use of the cartridge, the shuttle 28 removes the cartridge from the drive 30 and moves it to a slot of the storage magazine 24. The cartridges may be of any media, including magnetic tape, disks or other recordable and/or readable media.

The cartridge storage and handling apparatus 16 includes a power supply 32 which supplies power to the components in the unit and a controller 34 that controls the operation of the unit. The cartridge storage and handling apparatus 16 of the illustrated example is based on Tandberg Data Storage Library model T40 by the assignee of the present application. The cartridge storage and handling apparatus 16 has options for varying the configuration to include multiple tape drives, and multiple magazines. The robotic shuttle 28 is operable to rotate and move in transversal and vertical directions when manipulating the cartridges in the system. Further aspects of the cartridge storage and handling apparatus relating to the structural layout and robotics are disclosed in see U.S. patent application Ser. No. 10/973,535; Ser. No. 10/976,995; Ser. No. 10/976,472; and Ser. No. 10/909,054, which are incorporated herein by reference. An objective of the present development is to connect two or more units together, making a larger system with increased capacity where it is possible to transfer all of the cartridges within the system to any location within the new combined system.

The present application is not limited to the use of the cartridge storage and handling apparatus 16 shown, but can be used on all units containing a similar structural layout (either partially or as a whole), thereby allowing pass-through of a cartridges to be done in a similar way as described herein.

According to the present invention, a pass-through opening 36 is provided n the lower panel of the chassis 18. The opening 36 is preferably covered by a cover when not being used so as to keep dust and the like out of the interior of the cartridge storage and handling apparatus 16. The cover, also referenced 36, may be a panel or other covering for the opening and is preferably removable and replaceable by the user, such as by screws or other fasteners. It is foreseen that the cover may be fastenable by non-removable fasteners to prevent accidental dropping of a screw into the mechanism of the cartridge storage and handling apparatus 16. The opening 36 may be in the chassis 18 or in a housing that is mounted over the cartridge storage and handling apparatus 16. The rectangular shape of the illustrated opening 36 is one of many different shapes possible for the opening. It is possible that the opening could be larger, of a different shape or otherwise differ from that shown. It is also foreseen that the pass-through opening may be provided by simply removing the cover from the cartridge storage and handling apparatus 16 entirely, although this subjects the mechanisms inside to dust and debris.

The illustrated cartridge storage and handling apparatus 16 is show pre-modification for the expanded capacity. A few simple modifications will be made to expand the capacity of the apparatus, as will be explained in more detail in the following.

Figure 3:
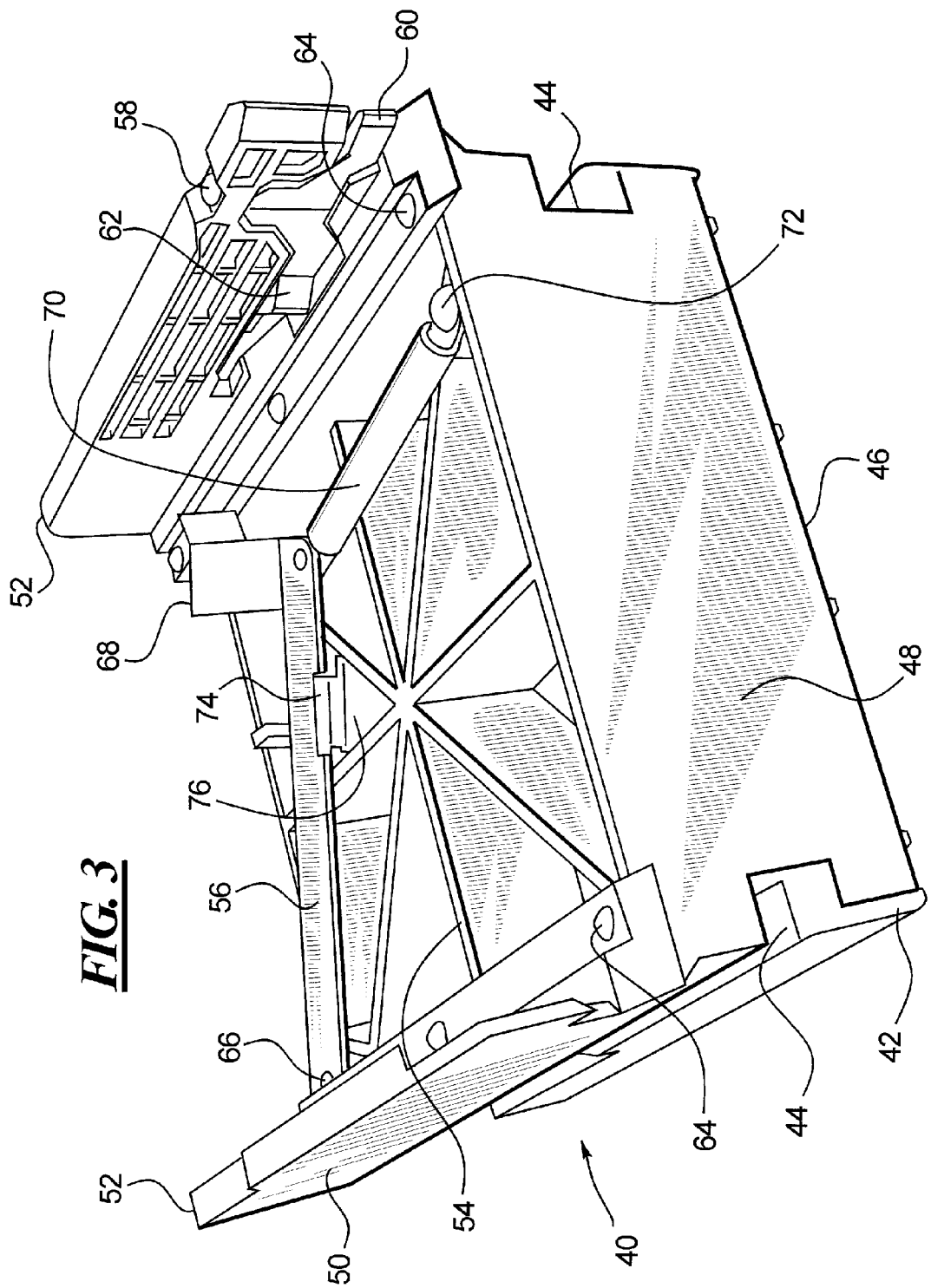
FIG. 3 is a perspective view of a pass-through box for use in a cartridge handling and storage unit to permit pass through of data cartridges from one unit to another.

FIG. 3 shows one embodiment of a pass-through box 40 as a modification of the cartridge storage and handling apparatus 16. The pass-through box 40 has a lower portion 42 that is shaped to fit into a cartridge holder of the cartridge shuttle (28 in FIG. 2). The lower portion 42 includes slots 44 that define the top edges of a cartridge shaped portion. In the preferred embodiment, the lower portion 42 is identical to a cartridge housing in physical size and physical gripping/locking features, including recess locations by which a cartridge is gripped and locked. When positioned in the cartridge holder of the cartridge shuttle, cartridge engaging portions fit into the slots 44 while a lower surface 46 of the lower portion 42 rests on the cartridge supporting surface of the cartridge shuttle 28. The lower surface 46 is shaped with ridges to facilitate sliding movement of the pass-through box 40. Since each cartridge shuttle for each different model of handling and storage unit may engage the cartridges in a different way, the lower portion 42 of different embodiments of the pass-through box 40 will be configured in different ways to fit into the respective different cartridge shuttles. This is within the skill of the person of skill in this art.

At the top of the lower portion 42 is a vertical extension 48, at top of which is a cartridge holder 50. The cartridge holder 50 defines a cartridge holding slot, also referenced 50, and is disposed above the lower portion 42 by the height of the extension 48. The height of the extension 48 my vary from one embodiment to another depending on the spacing of the handling and storage units 16 and 160 from one another when stacked as shown in FIG. 1 and depending on internal configuration details of each handling and storage unit. The cartridge holder 50 has side walls 52 that engage the opposite sides of a cartridge and a lower surface, here formed by cross members 54, on which the cartridge is supported. At an end of the cartridge holding space in the holder 50 is an eject arm 56 that is biased to press against a cartridge in the cartridge space. The eject arm 56, which may be of different configurations but here is pivotally mounted and biased by a spring, pushes an unrestrained cartridge from the cartridge space.

A latch 58 is mounted in one of the side walls 52. The illustrated latch 58 is a pivoting member and is pivotable to a position where a catch 62 of the latch 58 engages into a notch on the side of the cartridge and holds the cartridge in place in a fully inserted position, thereby resisting the force of the eject arm 56. A cartridge lock spring, which may be a coil spring or leaf spring, for example, is provided to bias the latch 58 to the locking position engaged into the cartridge notch. The latch 58 thereby automatically locks the cartridge in place when the cartridge is pressed into the fully inserted position. The latch 58 has a release 60 extending from the front of the pass-through box 40 at a position where it can be operated by the cartridge shuttle. Operation of the release 60 to an unlock position causes the latch 58 to pivot so as to move out of the cartridge notch and thus disengage the latch 58 from the cartridge, permitting the eject spring to push the cartridge out. By releasing the latch 58, the eject arm 56 pushes the cartridge out of the cartridge space to a position where it is better grasped by the cartridge shuttle 28. Other embodiments of latches may engage another surface or recess of the cartridge. Any type of latch may be used here to retain the cartridge in the locked position.

The cartridge space of the pass-through box 40 has slides 64 positioned for contact with the cartridge as the cartridge slides in and out of the space. The slides 64 are preferably inserts or attachments of a low friction material.

The eject arm 56 of the illustrated embodiment is pivoted at an end 66 where it is fastened to the pass-through box 40. The other end has a pusher plate 68 that bears against a surface of the cartridge. A coil tension spring 70 is connected to the pusher plate end of the eject arm 56 and to an anchor point 72 on the pass-through box 40. The anchor point 72 has a slide element as well. A stop 74 is provided at a position on the eject arm 56 and extends to a position where it contacts a stop plate 76 in the pass-through box 40 to halt movement of the eject arm 56 beyond a predetermined maximum position.

The illustrated pass-through box 40 includes a space for holding one cartridge so that that one cartridge can be passed to another storage and handling unit. It is contemplated to provide a pass-through box that includes spaces for holding two or more cartridges. The cartridge spaces of a two cartridge pass-through box are stacked on one another. Both cartridge spaces are provided with a latch and an eject spring. A further alternative provides a three cartridge pass-through box, where the three cartridge spaces are stacked one over the other. It is also possible to provide pass-through boxes with even greater numbers of cartridge slots. It is also contemplated to provide more than one pass-through box per storage and handling unit.

Figure 4:
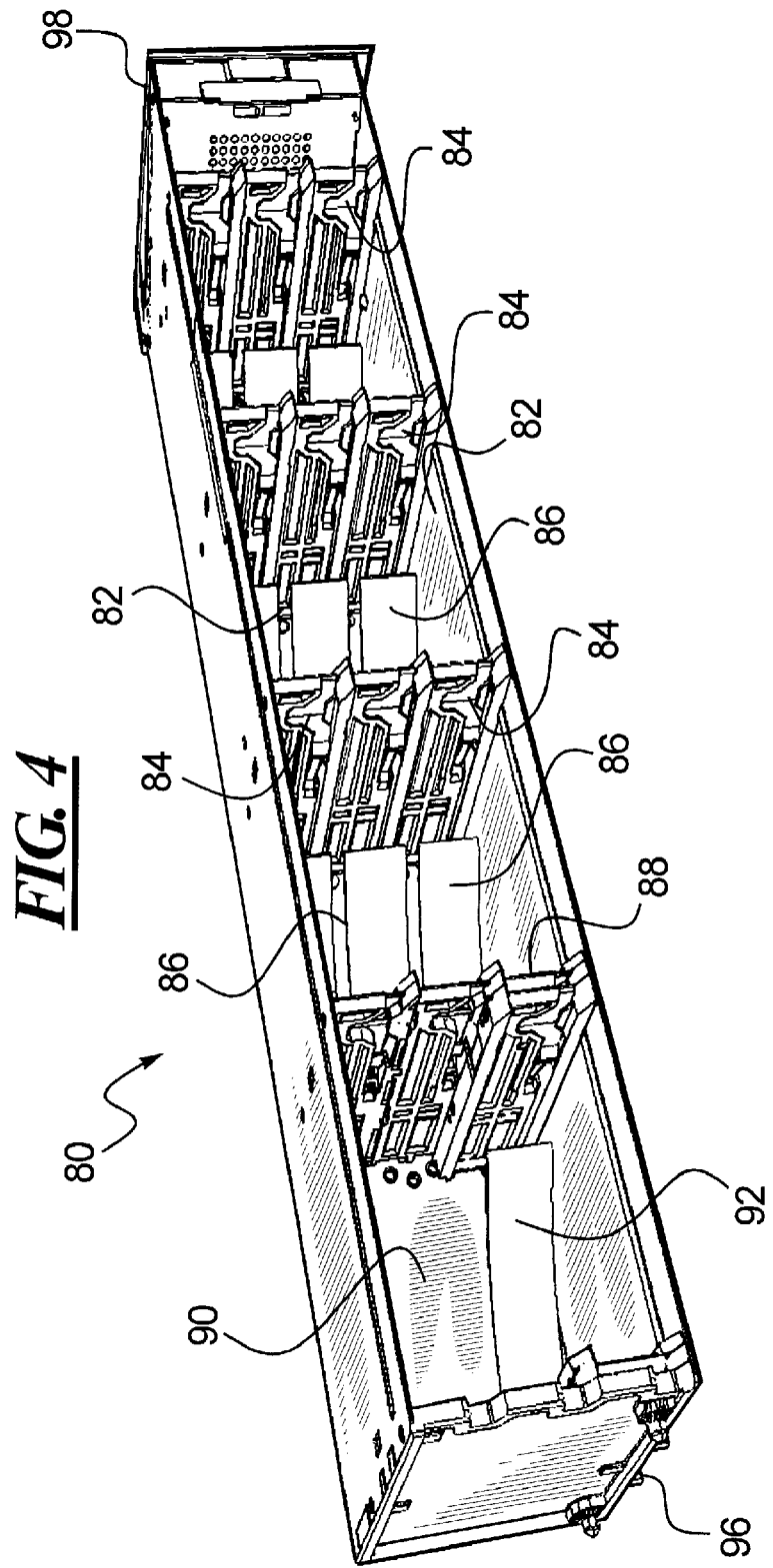
FIG. 4 is a front perspective view of cartridge magazine for use in a cartridge handling and storage unit, which includes a space for storing the pass-through box.

In FIG. 4, a replacement cartridge storage magazine 80 for replacing one of the existing storage magazines 24 in the cartridge storage and handling apparatus 16. The magazine 80 has slots 82 into which may be placed data cartridges for storage. The slots 82 have latches 84, which here are configured much like the latch 58 just described with respect to FIG. 3. The slots 82 each include an eject spring 86 that is in the shape of a leaf spring in this embodiment. The slots 82 are defined by ledges on side walls 88 at are mounted in the magazine indisposed on either side of the cartridge slot so that the cartridges rest on the ledges. The walls 88 divide the magazine 80 into four stacks, each stack being three cartridges high. The illustrated magazine 80 replaces a magazine 24 that holds twelve cartridges in four stacks of three. This replacement magazine 80 holds nine cartridges in three stacks of three and holds the pass-through box 40 as well.

With respect to the illustration of FIG. 4, the left most slot 90 of the magazine 80 is configured to hold the pass-through box 40 and although it is three cartridge slots high, it has a single eject spring 92 and single latch 94. The eject spring 86 and latch 94 of the pass-through box slot 90 is at the bottom of the slot where they interact with the cartridge shaped lower portion of the pass-through box 40 just as if it where a cartridge. The portions of the pass-through box slot 90 above the lower portion are preferably free of the ledges, eject springs and latches so that the pass-through box 40 can readily be positioned in the slot 90 and removed therefrom, just as if it were a cartridge.

The replacement magazine 80 is configured to slide into a cartridge storage and handling apparatus 16 to replace an existing magazine 24 and includes rails 96 for sliding along corresponding channels in the cartridge storage and handling apparatus 16. A front panel portion 98 is provided which forms a portion of the front panel 20 (see FIG. 2) when the magazine 80 is in the cartridge storage and handling apparatus 16.

In embodiments having a pass-through box with two or more cartridge slots, the replacement magazine is configured to hold a taller pass-through box. The replacement magazine and pass-through box are preferably configured so that the pass-through box matches the opening size in the magazine. It is also possible to provide a shorter pass-through box for example for a single cartridge in a magazine having a taller storage space for example for a two cartridge pass-through box.

Figure 5:
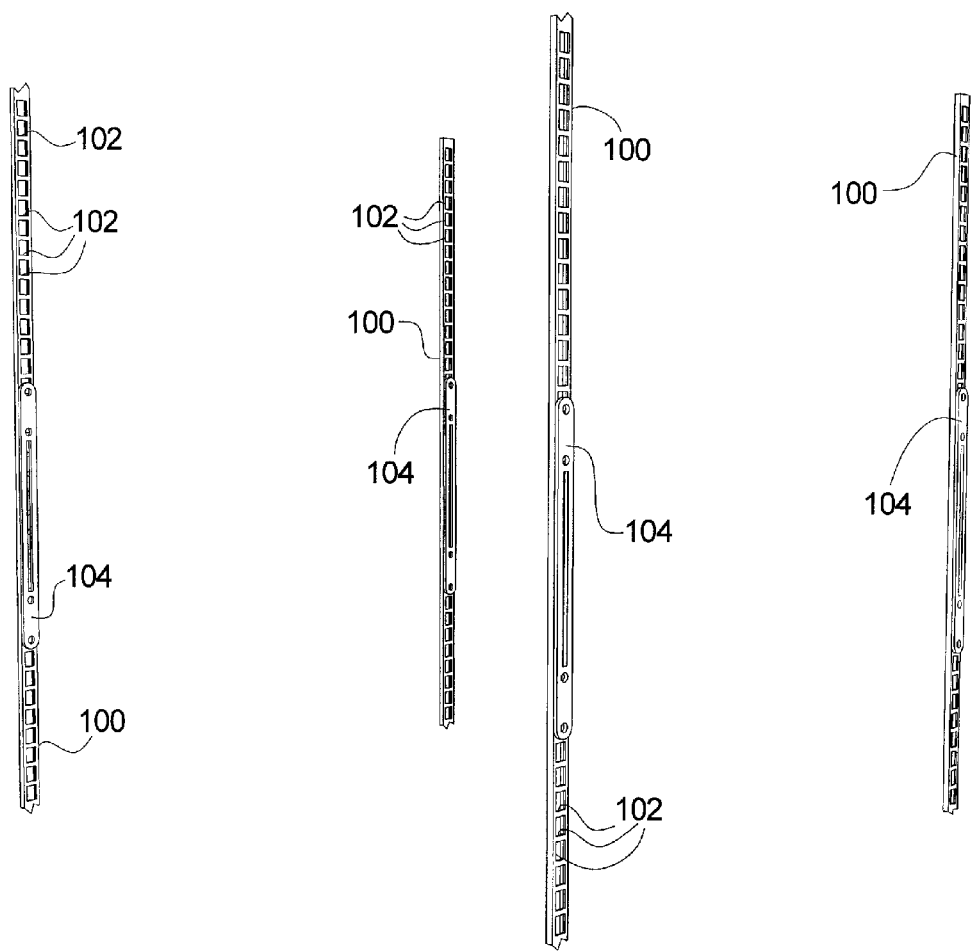
FIG. 5 is a perspective view of a rack for mounting computer network equipment, the rack having been provided with markings for mounting two cartridge handling and storage units relative to one another for expanded storage capacity.

FIG. 5 shows the vertical posts 100 of a rack, such as a computer equipment rack or network equipment rack. The illustrated rack has four posts 100, although other numbers of posts or arrangement of other mounting devices may be provided. The posts 100 include an arrangement of holes 102 at which equipment may be mounted, so that the equipment may be mounted at any of a number of locations along the posts. According to an aspect of the invention, a mounting guide 104 is provided on each of the posts 100. The mounting guide 104 indicates the location on the posts 100 for mounting the cartridge storage and handling units 16 relative to one another, thereby assuring the correct mutual spacing for operation as an expanded capacity combination system. The mounting guide 104 of the illustrated embodiment is a set of strips with markings printed thereon to indicate the correct mounting holes 102 in the posts 100 for use in mounting two cartridge storage and handling units 16 in position for combining in an expanded capacity system. The mounting guides 104 may block access to mounting holes 102 that should not be used since use of these holes would lead to improper relative positioning of the units or may otherwise indicate that these holes should not be used. The mounting guides 104 may be of strips such as adhesive strips to ensure that they are maintained securely in place, may be or non-adhesive strips, or may be simply a guide for marking indications onto the posts.

Figure 6:
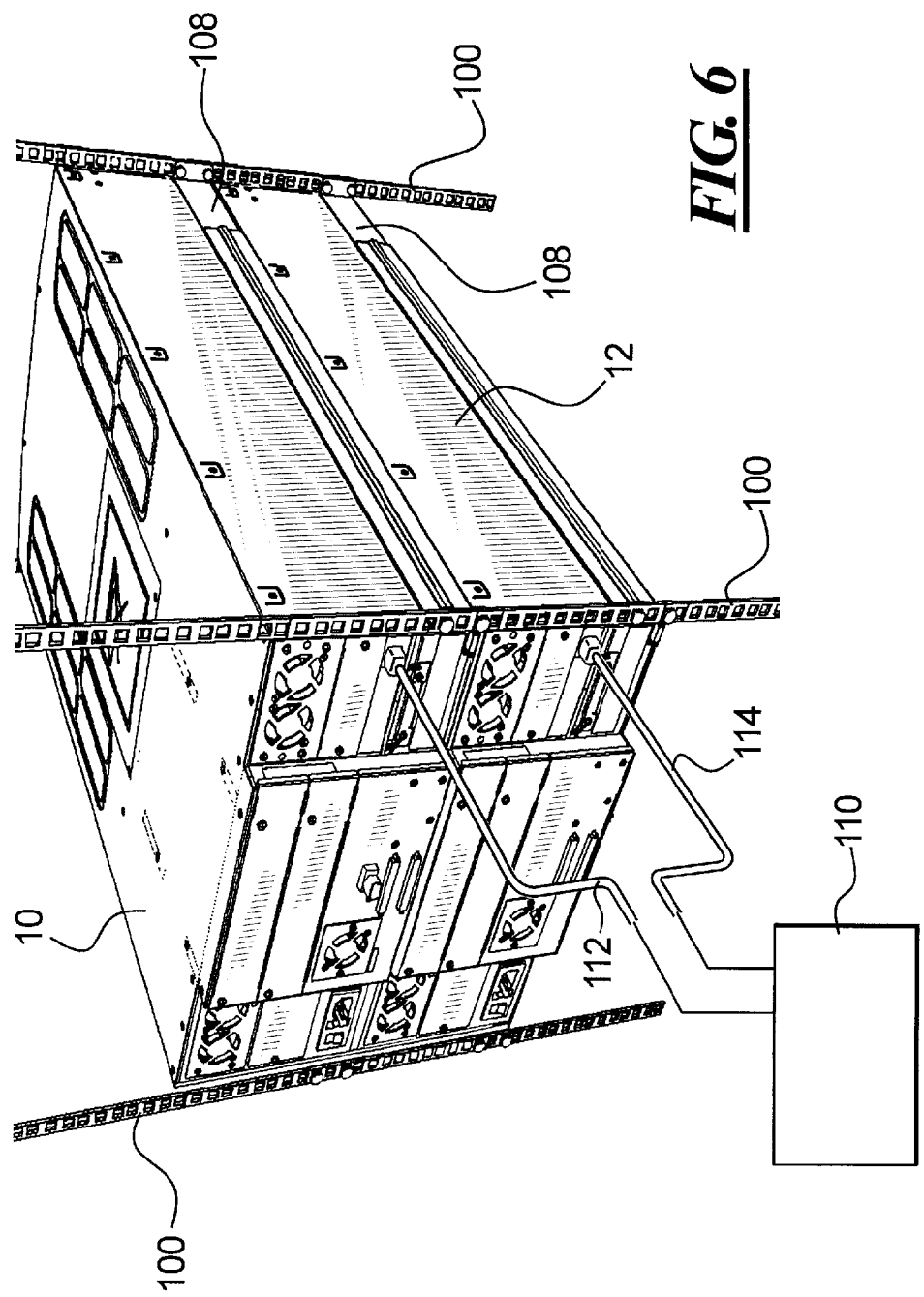
FIG. 6 is a rear perspective view of a rack with two cartridge handling and storage units mounted therein for pass-through of data cartridges from one unit to the other and showing a control connection to the units.

With reference to FIG. 6, a further aspect of the preferred embodiment is a control connection of the two or more cartridge handling and storage units, which are shown as units 10 and 12. The cartridge handling and storage units 10 and 12 are mounted on a four post rack 100. Pairs of rails 108 are provided extending from pairs of posts 100 and the cartridge handling and storage units 10 and 12 are mounted on the rails 108. The cartridge handling and storage units may be directly connected to the posts 100 or other structures may be used to mount the cartridge handling and storage units. The posts 100 of the rack arrangement are but one example of a mounting for positioning the cartridge handling and storage units in the proper respective positions, and all such mounting devices are encompassed within this invention.

The spacing of the units 10 and 12 from one another may be determined in a variety of ways. One such way is by the marked tape 104 shown in the preceding figure. The marked tape 104 may be used to determine the position of the units 10 and 12 directly or to determine the positions of the rails 108 on which the units 10 and 12 are mounted.

A controller 110 is provided as a separate unit, as a functional portion of another component of the computer network, or as a functional portion of one of the units 10 or 12. The controller 110 connects to an operating connection, for example on a rear panel of the units 10 and 12 by cables 112 and 114. The cables 112 and 114 may connect by any of a variety of connectors. The controller 110 may be used to control the operation of the robotic shuttles and tape drives in the units entirely, or may be used to control the operation of the shuttles only insofar as necessary to effect pass-through of a cartridge. The controller 110 may be embodied entirely by software that performs the additional control functions necessary for expanded capacity systems. Alternatively, the controller may be embodied partially in software and partially in hardware.

The cartridge storage and handling units 10 and 12 do not need to be physically connected together before being mounted into a standard rack. This eases the handling and installing issues since the units often are quite heavy. The correct vertical distance in the rack between pairs of cartridge storage and handling units is obtained in a preferred embodiment by using the special mounting tape stencil 104 where the correct distance between the rails 108 for the proper spacing of the units is established by allowing rail mounting screws only through punched holes in the stencil tape 104.

Figure 7:
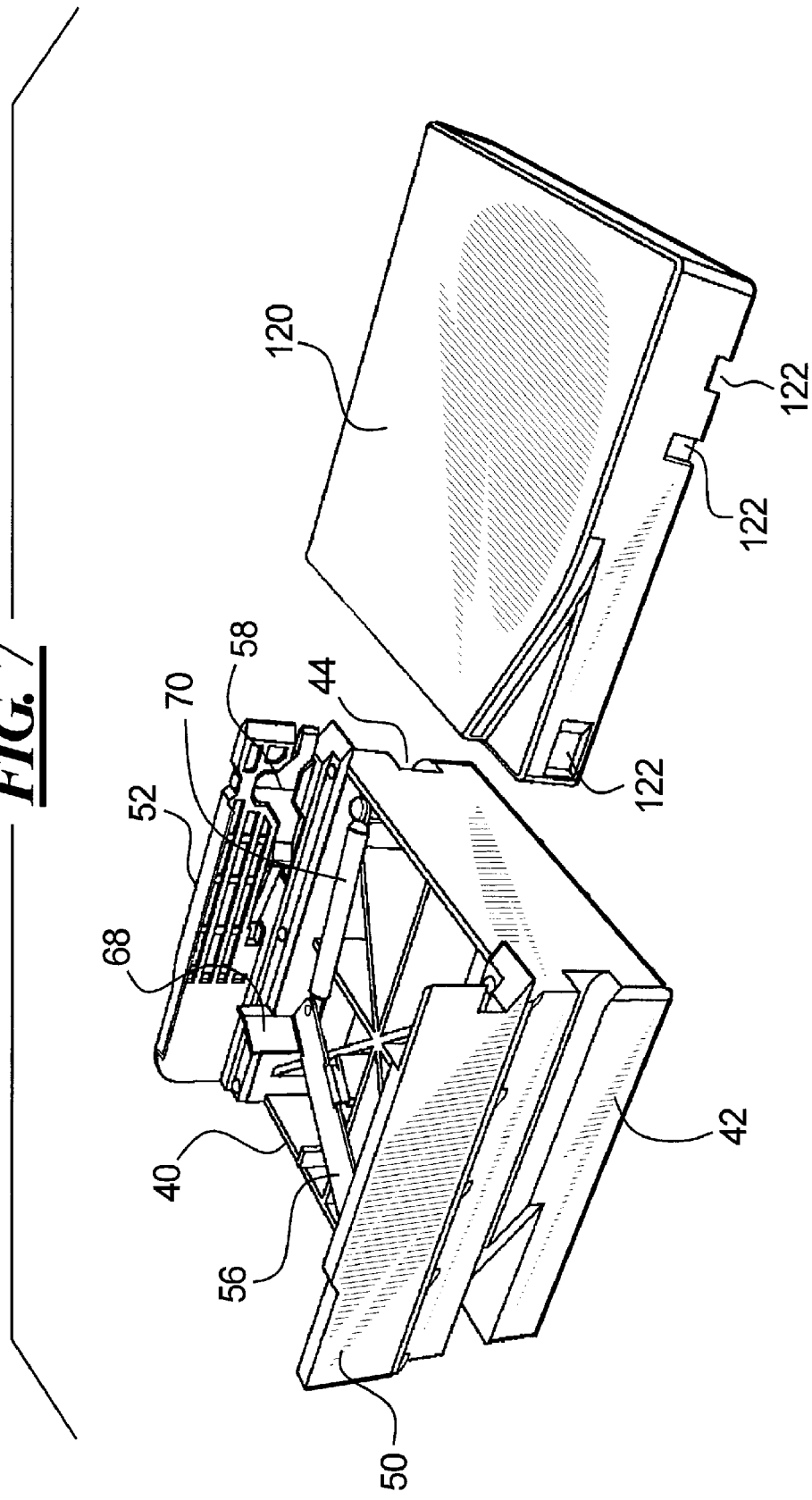
FIG. 7 is a perspective view of a data cartridge positioned for insertion into the pass-through box.

FIG. 7 shows a data cartridge 120 of a type which is well known. The data cartridge may include magnetic media, optical media, electro-optic media, solid state media or other media onto which data may be recorded and from which data may be read. The data cartridge 120 includes one or more notches 122 by which the cartridge may be grasped, locked, latched, handled, write protected, or the like. The present cartridge handling and storage units use at least one of the notches 122 to latch the cartridge in the pass-through box 40 as well as in the storage magazines 24 and 80. A number of the cartridges 120 are provided in the cartridge handling and storage unit, the number being limited by the storage capacity of the storage magazines. The present invention permits the expansion of the system to include a greater number of cartridges by increasing the number of storage magazine slots available.

The cartridge 120 is positioned for receipt into the pass-through box 40 between the sidewalls 50 and 52, where it is secured by the latch 58 which engages into one of the notches 122 on the opposite side of the cartridge 120 from that seen in FIG. 7. The illustration of FIG. 7 may also be considered as a view of the cartridge after its removal from the pass-through box 40.

Figure 8:
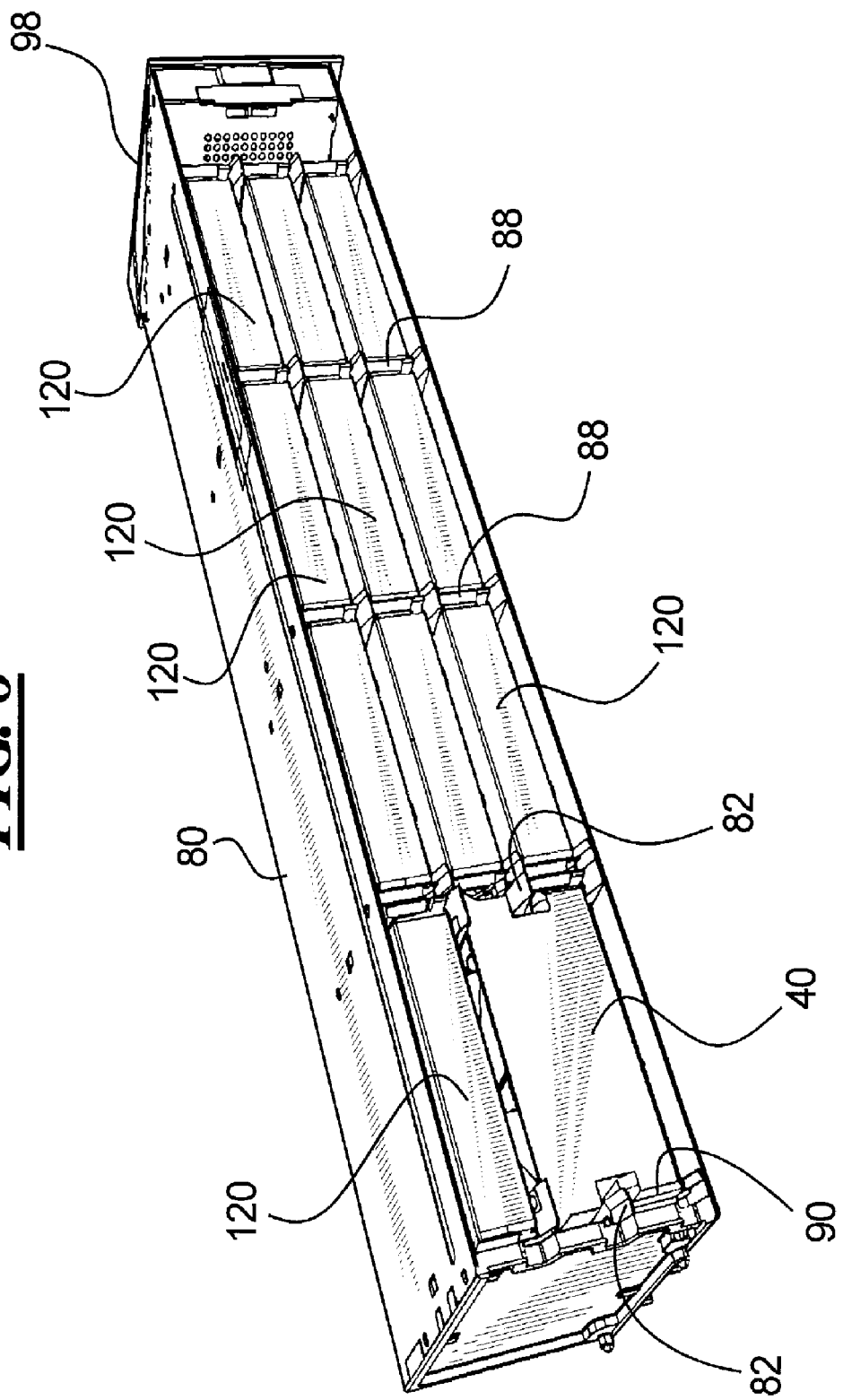
FIG. 8 is a perspective view of the storage magazine of FIG. 4 with the pass-through box positioned therein and a data cartridge in the pass-through box.

Referring now to FIG. 8, the storage magazine 80 of FIG. 4 is shown loaded with cartridges 120 and with the pass-through box 40. The pass-through box 40 itself has a cartridge 120 mounted therein while in the storage magazine 80. In a data storage system requiring increased capacity, it is preferred to completely load the storage magazine 80 as shown here to ensure that the greatest number of data cartridges is available for use by the system. Of course, it is also possible to install an empty or partially full storage magazine during the conversion of the data storage system to an expanded capacity system.

The pass-through box 40 fits into the pass-through box slot 90 of the storage magazine 80. The lower portion 42 fits within the cartridge shaped space defined by the ledges 82.

Figure 9:
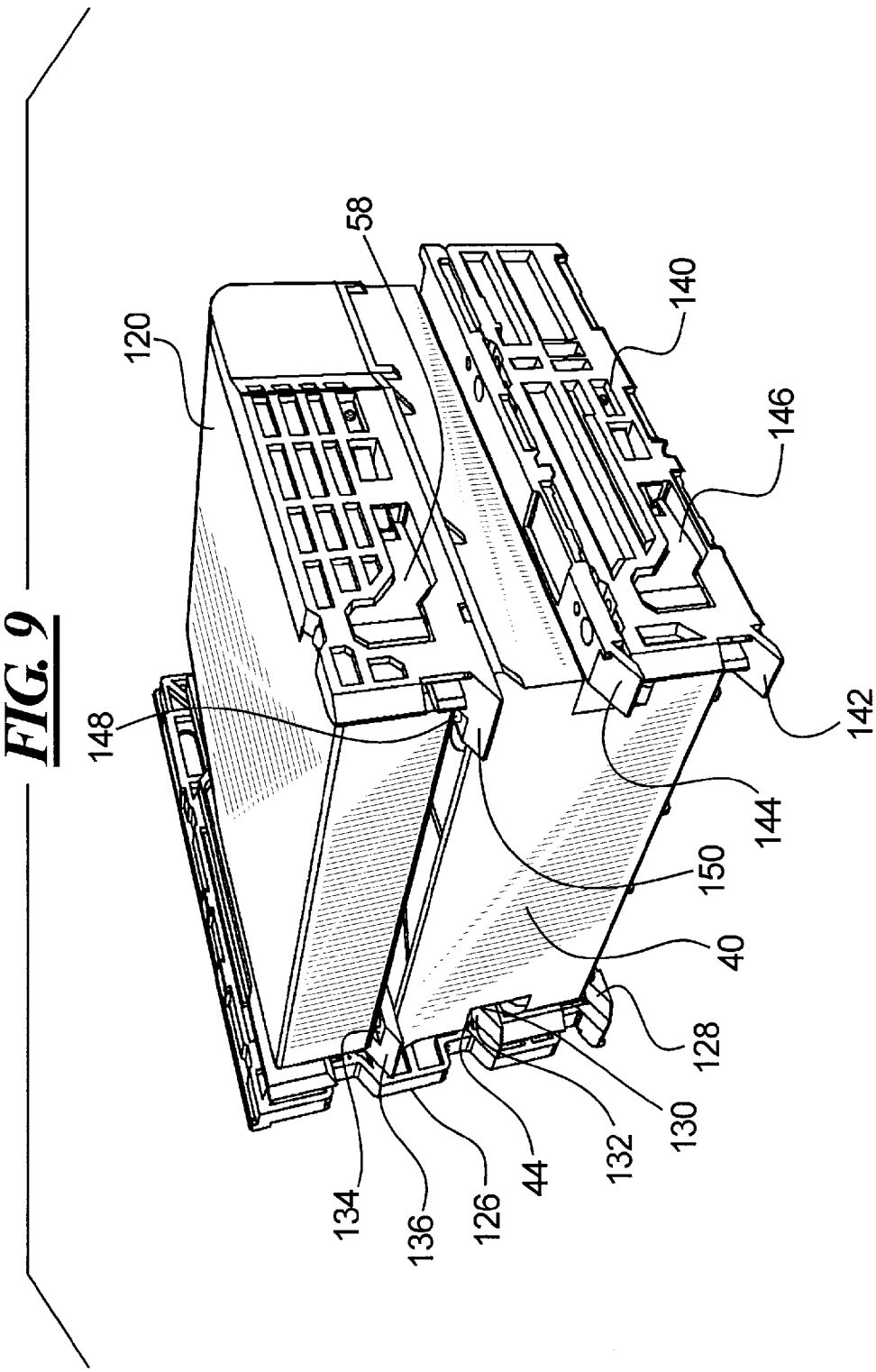
FIG. 9 is a perspective view of the pass-through box and data cartridge.

FIG. 9 shows the pass-through box 40 with a cartridge 120 positioned therein and retrained in a fully inserted position by the latch 58 in the pass-through box. Also shown in FIG. 9 is a portion of the sidewalls 88 of the storage magazine in which the pass-through box 40 is mounted. The sidewalls 88 include a sidewall 126 that forms the end of the storage magazine 80 (FIGS. 4 and 8) is shown on the far side of the pass-through box 40. The sidewall 126 has a lower ledge 128 that supports the pass-through box 40 and a ramp 128 at the front end of the lower ledge 128 that aids in guiding the pass-through box 40 into place. The sidewall 126 has a middle ledge 130 that fits into the channel 44 on the side of the pass-through box 40. The middle ledge 130 has a ramp 132 for guiding the pass-through box 40 in place as well. The middle ledge 130 is positioned as if for supporting a second cartridge in a slot above the lower cartridge slot.

The illustrated pass-through box 40 has a height corresponding to three cartridge slots and if the sidewall 126 were configured for holding cartridges, there would be a third, or upper ledge extending from the sidewall for supporting a third cartridge above the slot for the second cartridge. However, this upper ledge is not provided on the sidewall 126. Instead, the pass-through box 40 has a ledge portion 134 that supports the cartridge 120, the ledge portion 134 being in a comparable position to a third ledge. The ledge portion 134 has a ramp 136 at the front end, also in a position as if it were part of a third ledge.

On the opposite side of the pass-through box 40 is a sidewall 140 of a similar configuration, at least with regard to the ledges that engage the pass-through box. A lower ledge 142 and a middle ledge 144, each with leading ramps, is provided to engage the pass-through box 40. The sidewall 140 has the latch 146 that engages the pass-through box 40 at a recess that is in the same position as if the lower portion of the pass-through box 40 were a cartridge. The pass-through box 40 has it's latch 58 in the same position as if it were a latch for a third cartridge slot. No third ledge is provided on the sidewall 140 and, like the other side, a ledge portion 148 and ramp 150 is provided on the pass-through box. The opposite side surface of the sidewall 140 is configured like all other sidewalls in the storage magazine, with three ledges for defining three cartridge slots.

Thus, the conversion of the stand alone storage and handling unit to a unit that may be combined with others in a combined system requires a change in the storage magazine. But that change need only be a change in two sidewalls of the magazine in order to permit the pass-through box to be stored in the magazine. Changing the sidewalls in the magazine is not typically a user function, although it can be. Instead, the ability to construct the storage magazine for use with the pass-through box only by changing the two sidewalls means that the manufacture of the modified storage magazine uses mostly the same parts as the non-modified storage magazine, saving costs and simplifying manufacturing steps.

The sidewalls and/or the pass-through box may be configured with different dimensions than that shown. For instance, the storage magazine may be four or five or more cartridge slots high. In that case, the pass-through box may still be three slots high and the pass-through box storage location in the storage magazine may include cartridge storage slots above and/or below the pass-through box storage location. It is also possible that the pass-through box may be four or five, or more slots high as well. Such taller pass-through box may have a single cartridge space or two or more cartridge spaces.

Figure 10:
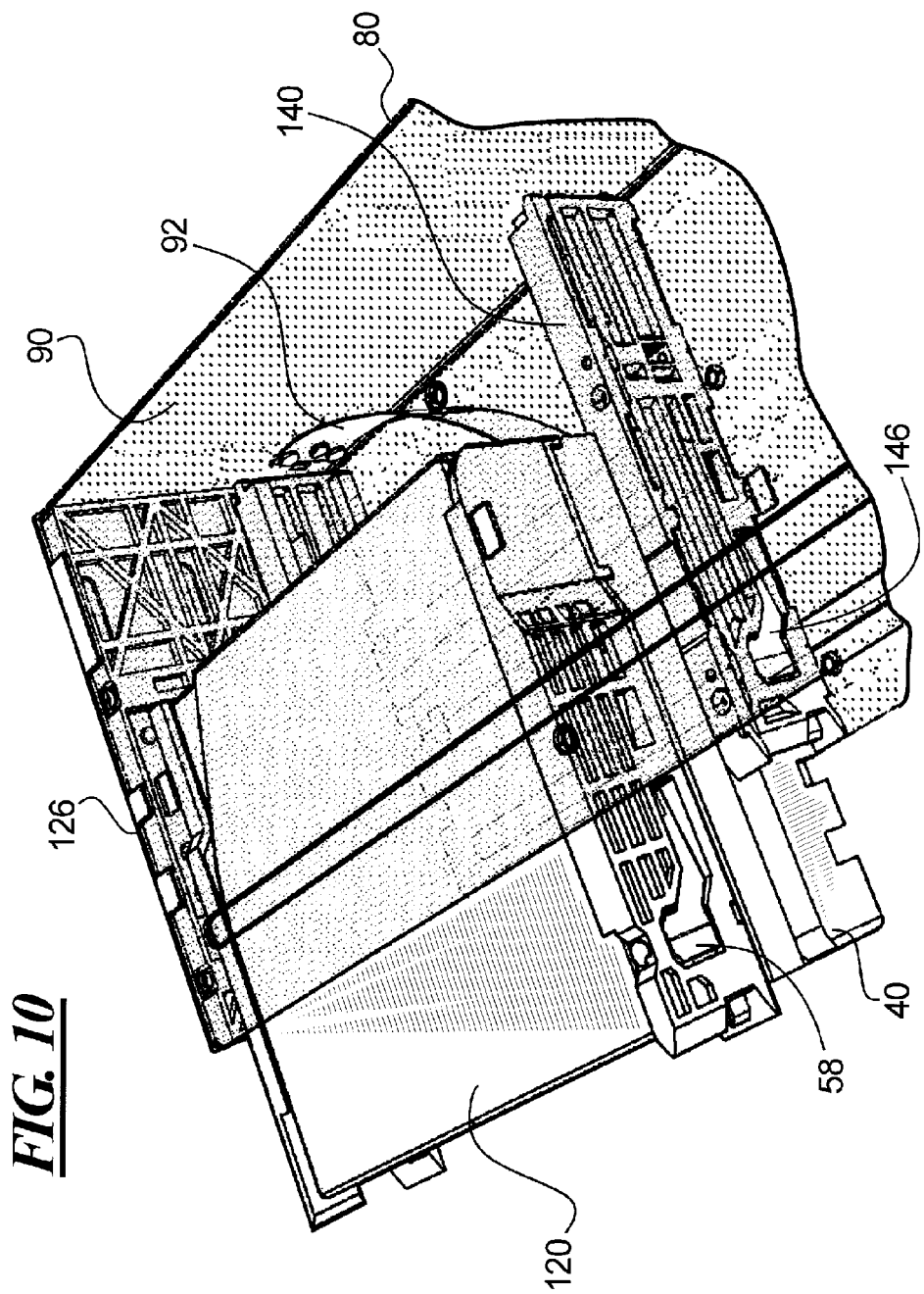
FIG. 10 is a top perspective view of the data cartridge in the pass-through box being pushed from the pass-through box storage position of the cartridge magazine and showing the cartridge magazine in phantom.

The process of mounting the pass-through box 40 into the storage magazine is shown in FIG. 10, wherein the pass-through box 40 has a cartridge 120 mounted therein and is slide into the pass-through box space 90 of the storage magazine. The inward motion of the pass-through box 40 must overcome the spring force of the leaf spring 92 in order to get to the fully inserted position where the latch 146 can engage the pass-through box. The view of FIG. 10 may also be considered as showing the pass-through box 40 being ejected from the space 90 by the force of the spring 92, such as after release of the latch 146.

The sidewall 140 shown here is only a fraction of the height of an ordinary sidewall in the storage magazine 80. The cartridge slots adjacent the pass-through box storage space 90 require a full height sidewall. As such, the sidewall 140 is a one sided sidewall, having ledges on only one side. A one sided full height sidewall having ledges only on the other side for defining the cartridge slots is provided adjacent the sidewall 140 for the full height (in this case three cartridge slot high) storage space. Alternately, the sidewall may have only two ledges on one side and a full complement of ledges on the other side.

Figure 11:
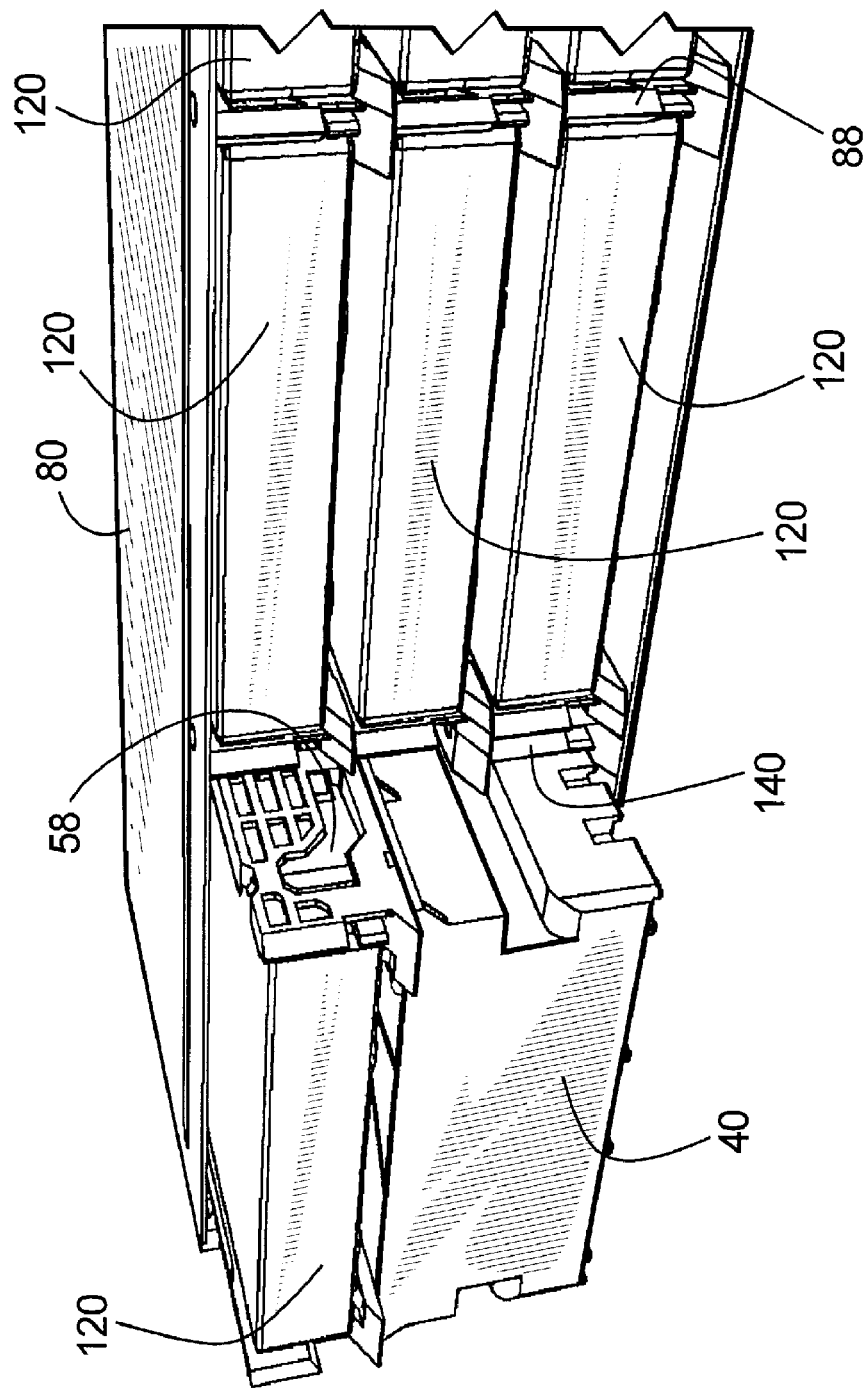
FIG. 11 is a front perspective view of the storage magazine with the pass-through box and cartridge partially inserted.

FIG. 11 shows another view of the storage magazine 80 filled with cartridges 120 in the corresponding cartridge slots. The pass-through box 40 is being positioned in the box storage space while holding a cartridge 120. It is possible to load the pass-through box 40 into the storage magazine 80 without a cartridge in the pass-through box. It is also possible to load the pass-through box 40 into the storage magazine 80 with few or no cartridges in the storage magazine 80.

Figure 12:
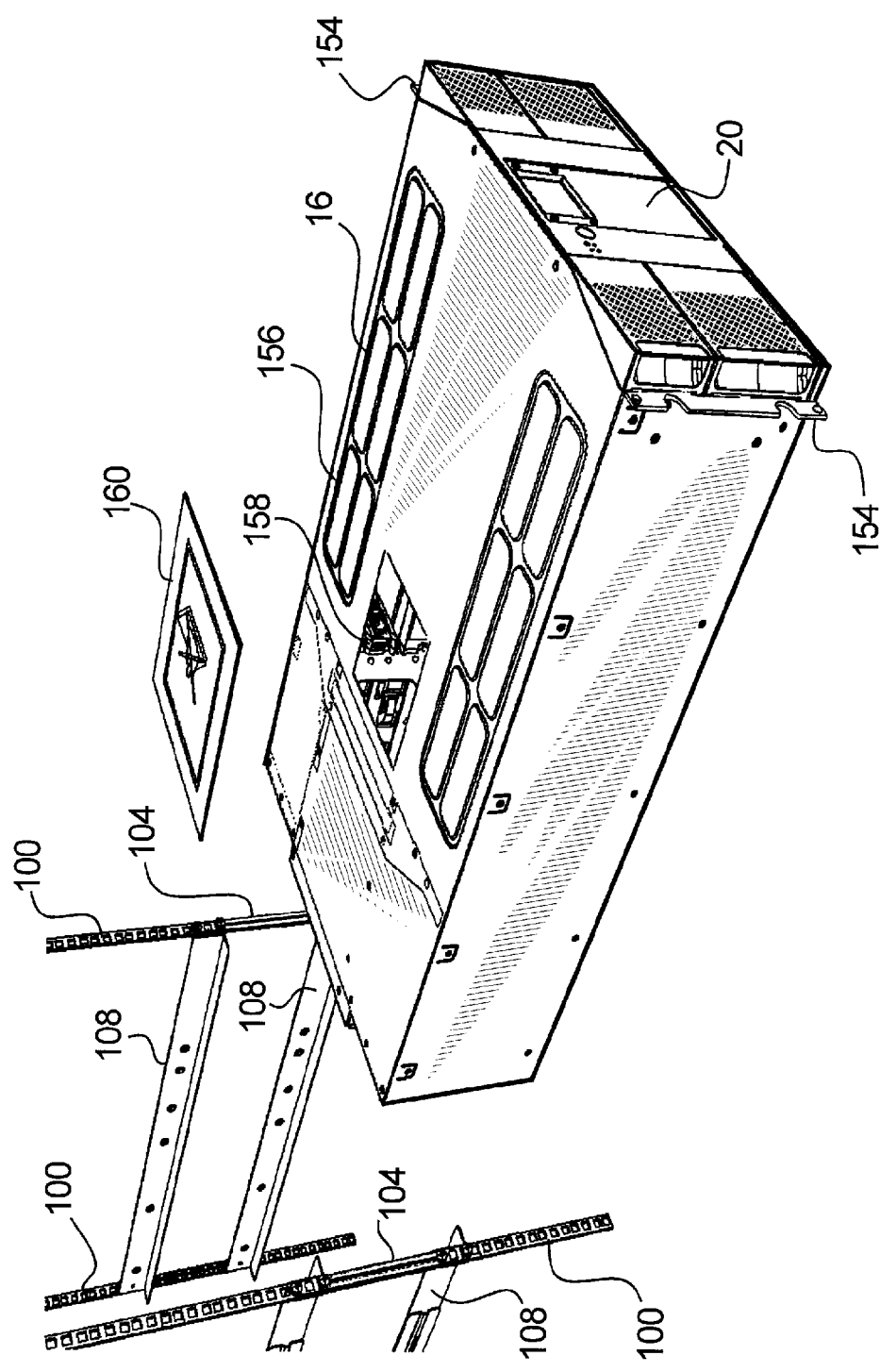
FIG. 12 is a top perspective view of a cartridge handling and storage unit with a pass-through opening and a cover for the pass-through opening shown in exploded view, the cartridge handling and storage unit being inserted into a mounting rack.

The steps for converting a stand alone cartridge handling and storage apparatus or unit to a combination system are shown in the following figures. These steps are merely one example of how to accomplish this task, and other steps and configurations may be used instead, within the scope of this invention. Referring next to FIG. 12, the cartridge storage and handling apparatus or autoloader 16 has the front panel 20 at the front end and an outer case 156 enclosing the body of the unit. Mounting ears 154 are provided on either side of the front panel 20 by which the handling and storage apparatus 16 may be mounted to a rack. The outer case 156 has a pass-through opening 158 in the top thereof. Either a case without the pass-through opening is replaced by a case 156 with the opening 158, or the case 156 is already provided with the opening 158 and is covered by a cover 160 when not needed. Here, the handling and storage apparatus 16 is modified by removing the cover 160.

The handling and storage apparatus 16 may have already been in use and so was mounted in a rack having the posts 100. The user may find it necessary to remove the handling and storage apparatus 16 from the rack so that the cover 160 can be removed. If the storage and handling apparatus 16 is being moved to a new location or is new, it will be out of the rack anyway so that the removal of the cover 160 is preformed prior to mounting the handling and storage apparatus 16 in the rack.

The posts 100 of the rack are provided with a pair of the rails 108 on which the handling and storage apparatus 16 will be mounted. Either prior to or after the mounting of the rails 108 the mounting distance guide in the form of a stencil tape 104 is placed on the posts 100. The stencils 104 must be put on the rack 100 at the same vertical distance from the bottom of the rack. Four stencil tapes 104 are used, one for each post 100, according to a preferred embodiment. The guide holes and the text on the stencil 104 ensure the correct vertical position for the rails 108 for one pair of handling and storage units. The rails 108 are mounted by placing the mounting screws through the indicated holes in the stencil tape and through the posts 100 and affixing the rail ends in place on the posts at the marked locations.

If the system contains more than two handling and storage units 16; attachment of further sets of the stencil tape are performed to define the spacing for the attachment of further rails 108. Screws are positioned through the holes in the further stencil tape to secure the further rails. It is also possible that the stencil set is re-used for further spacing definition of further handling and storage units from one another.

Figure 13:
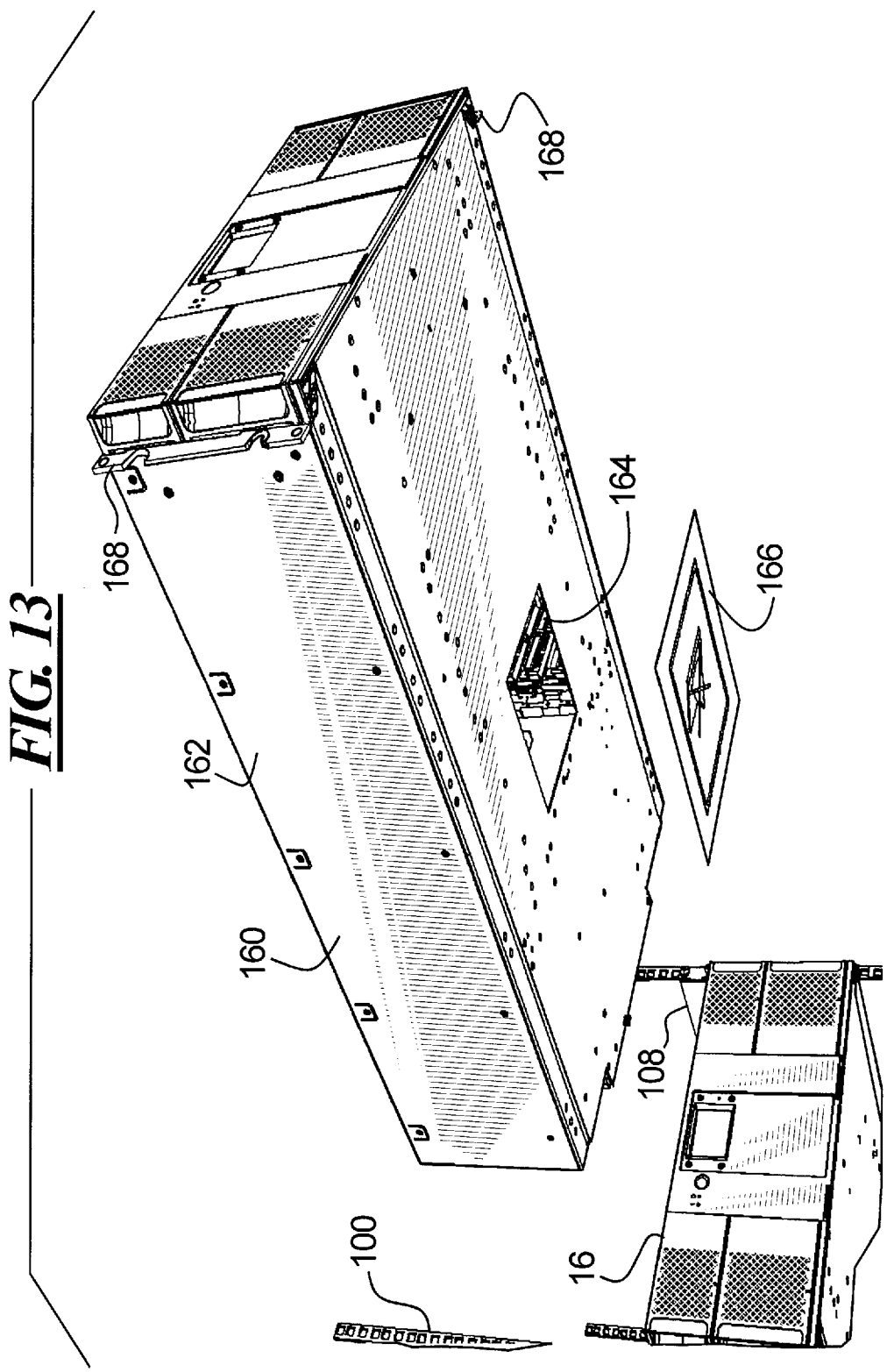
FIG. 13 is a bottom perspective view of a second cartridge handling and storage unit with a pass-through opening and a cover for the pass-through opening shown in exploded view, the cartridge handling and storage unit being inserted into a mounting rack above the cartridge handling and storage unit of FIG. 12.

In FIG. 13, a second handling and storage apparatus 160 is provided to expand the capacity of the data storage system. The second handling and storage apparatus 160 has a housing 162 and the housing 162 has a pass-through opening 164 formed in the bottom surface thereof. The pass-through opening 164 is at a position to that it is in registration with the opening 158 in the top of the housing 156 of the handling and storage apparatus 16 over which the handling and storage apparatus 160 will be mounted. The housing 162 may already have the opening 164 or the opening may be provided by replacement of a closed housing with a housing having the opening. The opening 164 has been covered by a cover 166, which is removed and discarded.

The handling and storage apparatus 160 has mounting ears 168 on either side of the front panel by which the handling and storage apparatus 160 is fastened to the front posts 100 of the rack. The handling and storage apparatus 160 is put into place on the upper rails 108 to thereby define the proper spacing from the lower handling and storage apparatus 16 which is already mounted on the posts 100 of the rack in this view. It is also possible to mount the upper unit first, before the lower unit. In configurations having more than two units, the order of mounting is not so important as the rails that define the mutual spacing of the units are set using the stencils or other marking means.

As becomes apparent from the foregoing, the pass-through openings in the housings must be provided at a portion of the housings facing the adjacent units with which the unit will interact. If the unit is to be mounted with an adjoining unit above it, a pass-through opening must be provided in the top of the housing; if the adjoining unit is below, the pass-through opening must be in the bottom of the housing; and if adjoining units are provided both above and below, then pass-through openings must be provided both in the top and the bottom.

Figure 14:
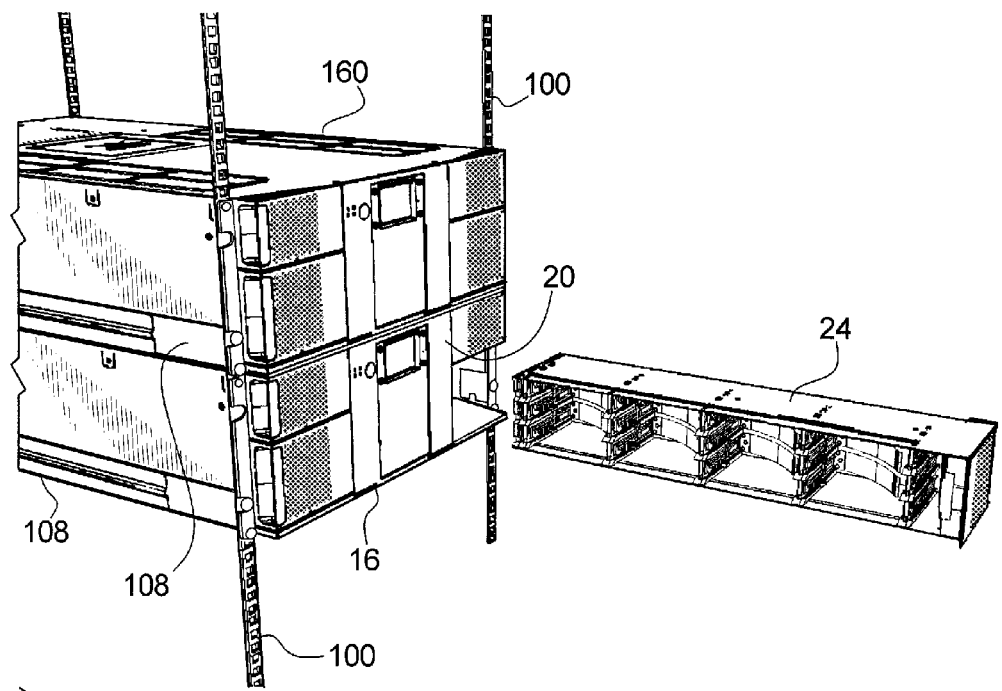
FIG. 14 is a perspective view of a storage magazine being removed from the lower of the two cartridge handling and storage units of FIG. 13.

FIG. 14 shows the two handling and storage units 16 and 160 mounted on the posts 100 of the rack. As discussed above, at least one of the storage magazines 24 of at least one unit are removable from the units according to the preferred embodiment. One storage magazine 24 of the lower handling and storage apparatus 16 is being removed via an opening in the front panel 20. Once removed, the storage magazine 24 may be discarded, returned to the manufacturer or stored for later use. The illustrated handling and storage units each have four magazines, one or more if which is removable for filling with data cartridges, for example. It is possible to use the present method and apparatus on storage and handling units having only a single magazine, two magazines, three magazines, or more.

Figure 15:
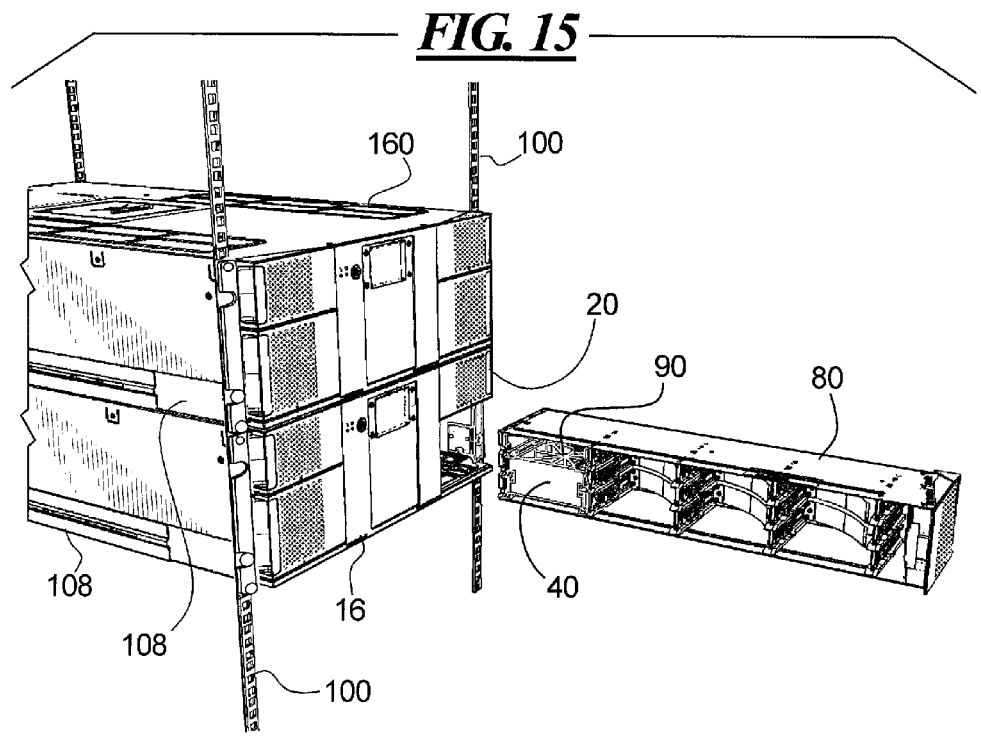
FIG. 15 is a perspective view of the two cartridge handling and storage units of FIG. 14 with a storage magazine having a pass-through box therein being mounted in the lower cartridge handling and storage unit.

FIG. 15 shows the replacement storage magazine 80 being inserted into the lower handling and storage apparatus 16 in place of the storage magazine 24 removed in FIG. 14. The replacement storage magazine 80, as has been described above, has a space 90 for storing the pass-through box 40. In the illustration, the storage magazine 80 includes no cartridges, but does include the pass-through box 40. It is also possible that the storage magazine could be filled or partially filled with data cartridges. By replacing the storage magazine with the magazine 80, the pass-through box 40 is added to an existing handling and storage apparatus without disassembly or other modification of the unit.

The handling and storage apparatus 16 may already have a pass-through box 40 in it, either in one of the storage magazines or in another location in the unit. If the pass-through box 40 is already present, the replacement of the storage magazine is not necessary be convert the apparatus to an expanded data storage system, so this step could be eliminated.

Cables are connected to the two handling and storage units 16 and 160, as shown in FIG. 6 and a controller 110 is connected to operate the combined system. The controller 110 performs a calibration function on the combined system in a preferred embodiment. If a further expansion is necessary, further storage and handling units may be added to the already expanded system.

Figure 16:
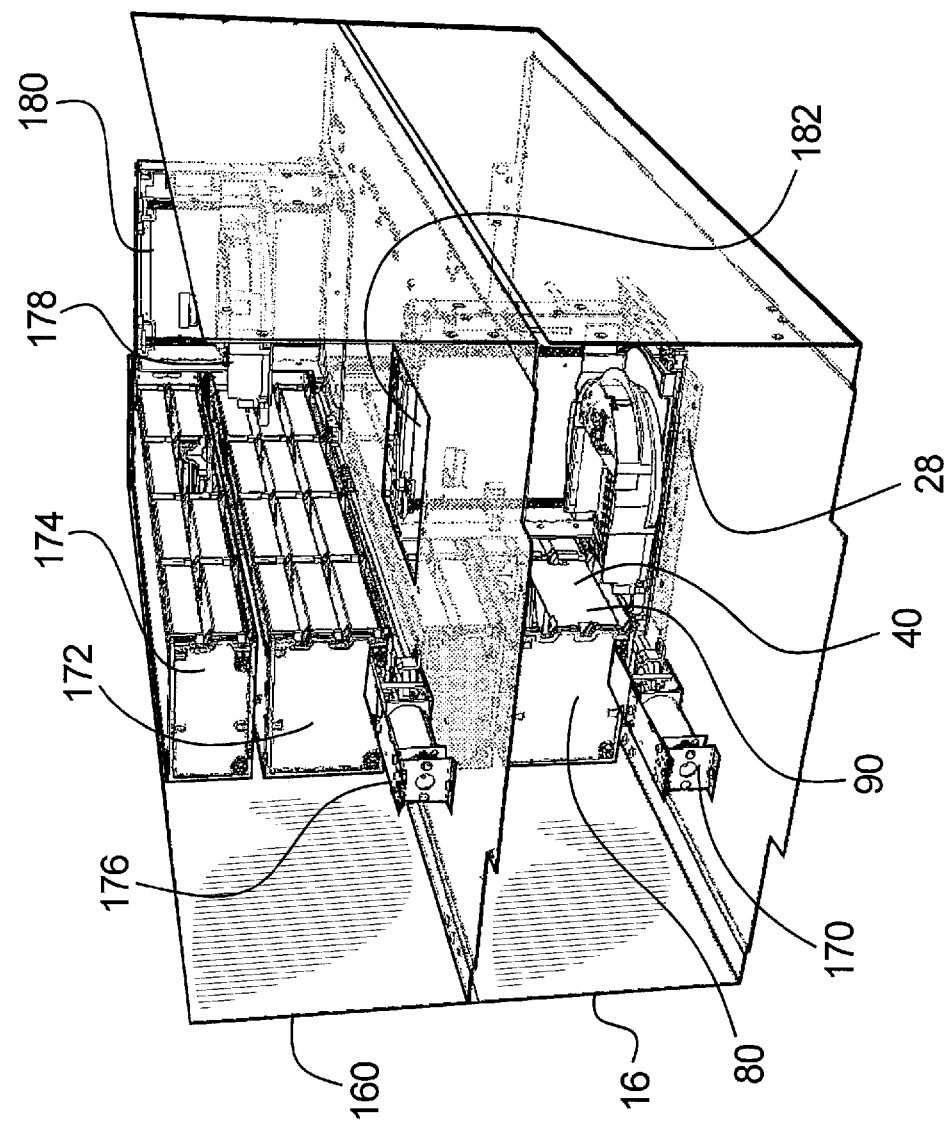
FIG. 16 is a perspective view of the stacked cartridge handling and storage units in phantom showing a robotic cartridge shuttle of the lower cartridge handling and storage unit prepared to engage the pass-through box.

The sequence of steps performed to move a data cartridge 120 between adjacent storage and handling units 16 and 160 of the combined system are set forth in the following example. A determination is made that a particular cartridge 120 of interest is in one of the units and is needed in the other unit. The transfer of the cartridge may be necessary because the unit containing the cartridge 120 has no read/write drive and so the cartridge 120 must be moved to a unit having a read/write drive, or the read/write drive of the unit having the cartridge 120 is busy or otherwise unavailable, or the cartridge 120 is to be moved for some other reason. The combined system is shown in FIG. 16, although only the involved components are visible, all other components of the system are rendered invisible for the sake of simplicity.

The lower cartridge storage and handling unit 16 has the storage magazine 80 in which is provided the pass-through box 40 in the pass-through box storage space 90. A traverse drive 170 with a motor, and gear and pulley system is provided in the lower unit 16 by which the cartridge shuttle 28 is moved along the central channel 26 in front of the storage magazine 80. A second magazine is mounted above the magazine 80, although it is partially obscured from view. The lower unit 16 also includes the robotic cartridge shuttle 28 that is operable to access any of the cartridges in the storage magazine 80 as well as cartridges in any other storage magazine in the lower unit 16. The robotic cartridge shuttle 28 may also retrieve cartridges that are being ejected by a read/write drive (not shown in this view) or provide cartridges to the read/write drive. The storage magazine 80 of the lower storage and handling apparatus has also been determined to be holding a cartridge 120 in one of its slots that is to be moved to the upper storage and handling unit 160.

The upper storage and handling unit 160 has a two part storage magazine including a lower storage magazine 172 and an upper storage magazine 174. In the present configuration the lower magazine 172 may be removed from the unit 160 by the user sliding the magazine 172 out of the unit. Removal of the magazine from the upper unit is not required for transfer of the cartridge to the upper unit. As will be described below, the magazine of the upper unit may be replaced if a further unit is added above the upper unit. Other magazines are typically provided in the upper unit 160 as well, although they are not shown for the sake of simplicity.

The upper unit 160 has a robotic cartridge shuttle 180 that is operable to access each slot of the storage magazines 172 and 174 as well as any other magazines in the storage and handling unit 160. The shuttle 180 is movable along the space in front of the magazines 172 and 174 by operation of a drive motor and gear and pulley arrangement 176. The upper and lower units 160 and 16 are in communication with one another by a pass-through opening 182 that extends between the two units and is formed by the in-registration position of openings in the housings of the two units.

Figure 17:
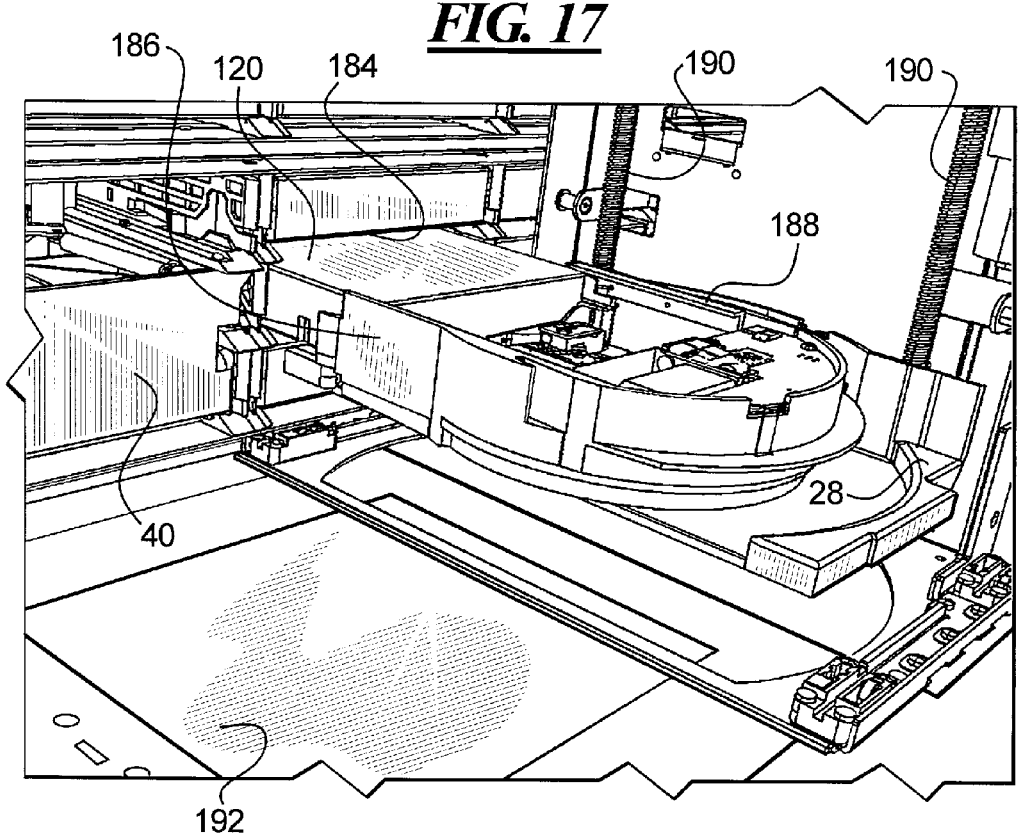
FIG. 17 shows an enlarged perspective view of the robotic cartridge shuttle retrieving a cartridge from a storage slot in the storage magazine.

FIG. 17 shows the robotic cartridge shuttle 28 of the lower storage and handling unit 16 at a slot 184 in the storage magazine 80 that holds a data cartridge 120 that is to be moved to the upper storage and handling unit 160. The shuttle 28 includes cartridge grippers 186 that push the latch 58 (as shown in FIG. 3) that secures the cartridge 120 in the slot 184 to release the latch. The illustrated latch 58 is pushed to the left so that it releases and the cartridge eject spring 86 can push the cartridge 120 part way out of the slot 184. The operation of the latch 58 to the released position may be accomplished by the gripper portion 186 or by another portion of the cartridge shuttle. It is also foreseen that the latch 58 may be released by remote operation, such as by an electronic signal to a solenoid or the like. The partially ejected cartridge 120 is gripped by cartridge grippers 186 that engage into notches 122 on the sides of the cartridge 120. The gripper 186 withdraws the cartridge 120 from the slot 184 and moves the cartridge 120 into a rotator portion 188 of the cartridge shuttle 180. The rotator portion 188 is operable to rotate the cartridge gripper and the cartridge 120 around a vertical axis in order to re-orient the cartridge, for example, for use in the read/write device 30 or to place the cartridge into a storage magazine on an opposite side of the storage and handling apparatus. In some embodiments, the components in the storage and handling apparatus are oriented so that rotation of the cartridge is not required and thus no rotator portion is provided in the cartridge shuttle.

The housing of the lower unit 16 has a pass-through opening 192 on its lower surface as seen in FIG. 17. The pass-through opening 192 is closed by a cover, but may be opened if needed to receive a pass-through cartridge from a storage and handling apparatus mounted below the unit 16.

Figure 18:
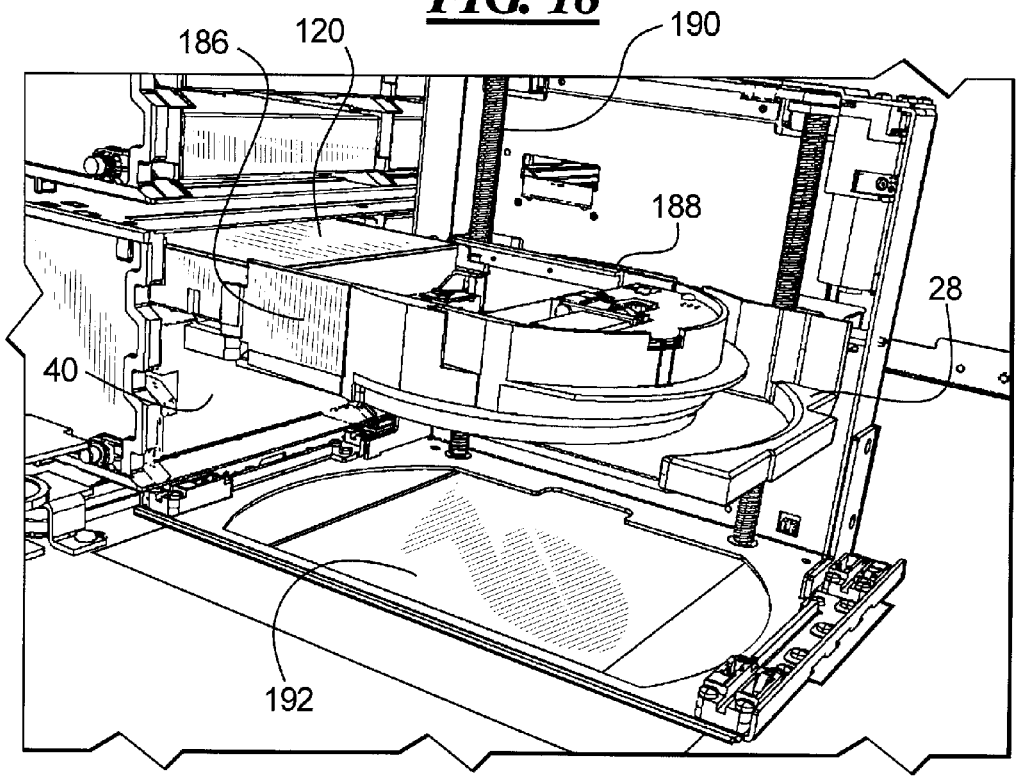
FIG. 18 is an enlarged perspective view of the robotic cartridge shuttle moving the cartridge to the pass-through box.

As shown in FIG. 18, the cartridge shuttle 28 holding the cartridge 120 is moved translationally along the central channel 26 in front of the storage magazine 80 until it reaches a position at the pass-through box 40. The movement of the shuttle 28 is apparent by comparing the position relative to the pass-through opening 192 in FIGS. 17 and 18. If the cartridge 120 has been removed from a slot above or below the pass-through box 40, this translational movement is not required. If the position of the cartridge is not in vertical alignment with the cartridge space in the stored pass-through box 40, the cartridge shuttle 28 operates its elevator portion 190 to raise or lower the cartridge 120 as needed to bring it into alignment with the cartridge slot 184 in the upper portion of the pass-through box 40. The gripper portion 186 of the shuttle then moves the cartridge 120 into the cartridge slot 184 in the pass-through box 40, pressing the cartridge 120 into place far enough that the force of the eject arm 56 of the pass-through box 40 is overcome and the latch 58 of the pass-through box 40 engages the cartridge 120 and secures it into place. A pusher element may be provided on the cartridge shuttle 28 may be used for the final pushing of the cartridge into the latched position in the pass-through box 40.

Figure 19:
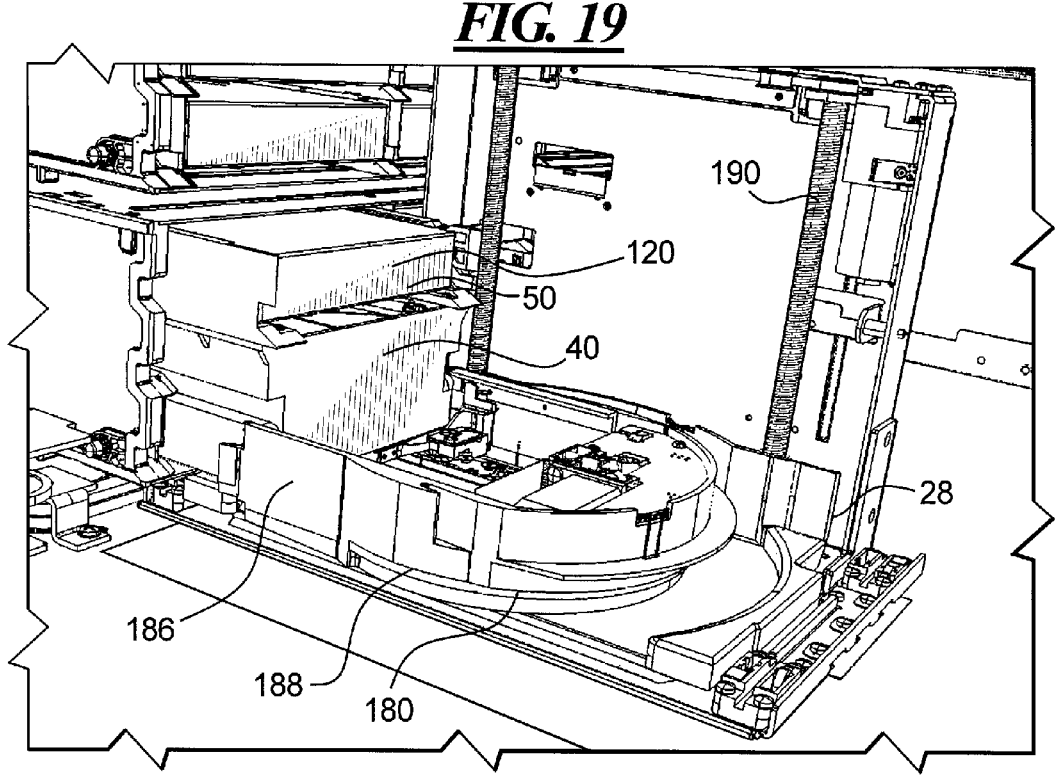
FIG. 19 is an enlarged perspective view of the robotic cartridge shuttle moving the pass-through box from the storage magazine.

With the cartridge 120 latched into the pass-through box 40, the cartridge shuttle 28 retracts the gripper portion 186 and lowers the elevator portion 190 to align the gripper 186 with the lower portion 42 of the pass-through box 40, as shown in FIG. 19. In some embodiments, it is not necessary to retract the gripper during the lowering of the elevator portion. The gripper portion, or other element, of the shuttle 28 releases the latch 146 that holds the pass-through box 40 in the pass-through box storage space 90. The pass-through box 40 is pushed outward from the storage space 90 by the eject spring 92 to a position where the grippers 186 may engage the lower portion 42 of the pass-through box 40 as if it were a cartridge. The grippers 186 on the shuttle 28 engage gripper notches in the lower portion of the pass-through box 40 which are located in the same position as on a cartridge and draw the pass-through box 40 onto the rotator portion 188.

Figure 20:
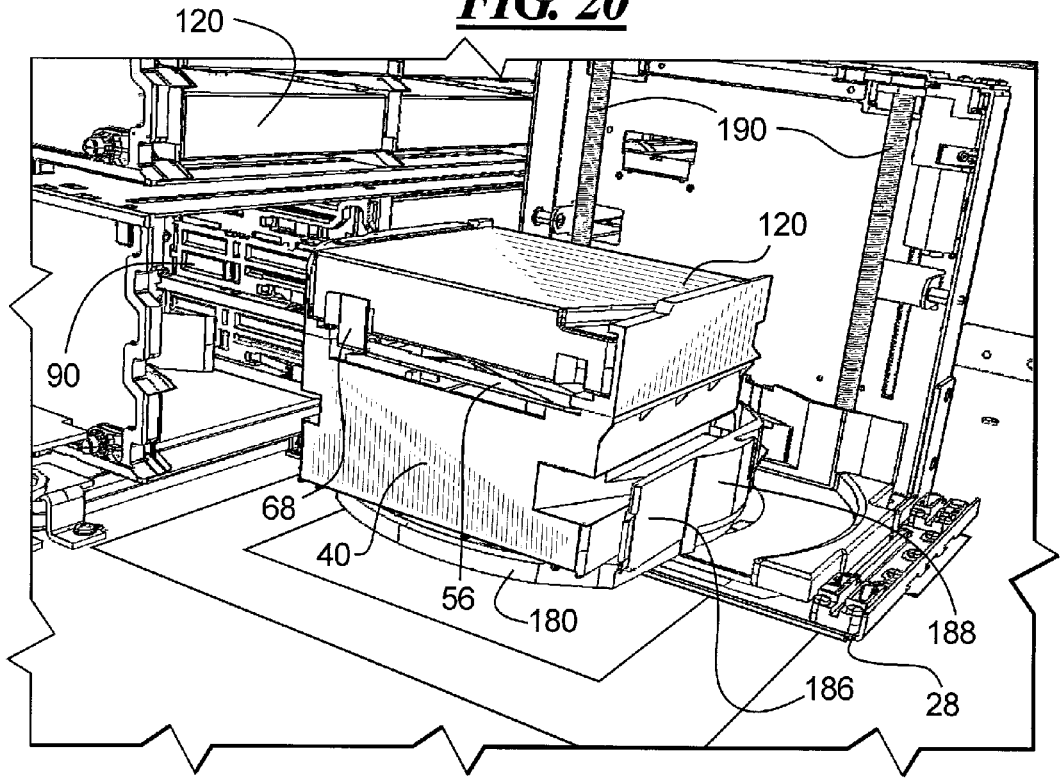
FIG. 20 is an enlarged perspective view of the robotic cartridge shuttle holding the pass-through box in a rotated position, the pass-through box having a cartridge therein.

As shown in FIG. 20, the shuttle 28 now has the pass-through box 40 with the desired cartridge 120 held therein on the body of the shuttle 28. The rotator 188 of the preferred embodiment rotates the pass-through box 40 and the cartridge 120 to a pass-through orientation. The pass-through orientation depends on the orientation of the cartridge when engaged by the gripper of the shuttle, on the orientation of the cartridge shuttle in the upper unit, and on the orientation of the pass-through opening, for example. In the illustrated example, the cartridge is rotated by 90 degrees in the counter-clockwise direction. The cartridge shuttle 28 may also be moved in a traverse or translational direction to position the desired cartridge and the pass-through box 40 beneath and in alignment with the pass-through opening 182. It is not necessary to move the cartridge shuttle in every instance where the shuttle is already in alignment with the pass-through opening 182. For example, it is foreseen to position the pass-through opening 182 above the pass-through box storage space 90 so that the translational movement during this step may be eliminated.

Figure 21:
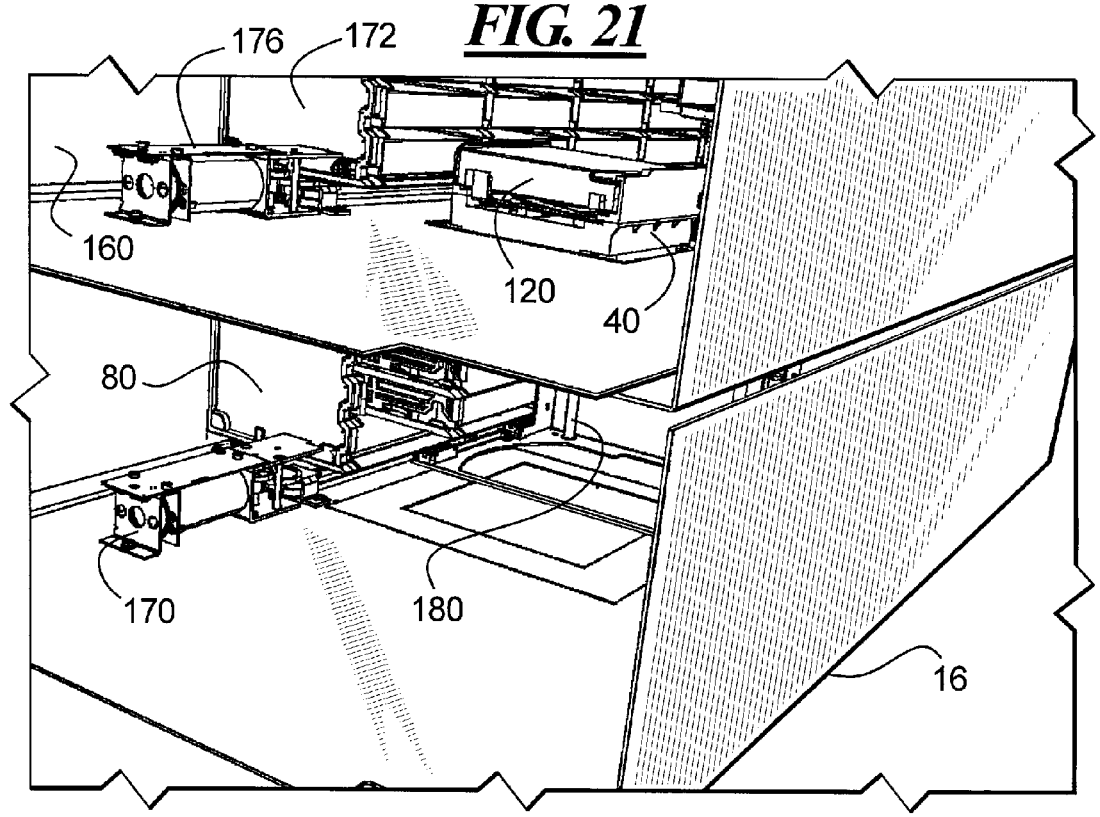
FIG. 21 is a perspective view of a robotic cartridge shuttle with a pass-through box passing a cartridge from one cartridge storage and handling apparatus to another, the cartridge storage and handling apparatus being shown in phantom.

As shown in FIG. 21, the elevator portion 190 of the cartridge shuttle 28 in the lower unit is operated to raise the pass-through box 40 so that at least the top portion with the cartridge holding space 50 passes through the pass-through opening 182 and into the interior of the upper storage and handling apparatus 160. The extent to which the elevator mechanism 190 is capable of lifting the pass-through box 40, the height of the pass-through box 40, and the spacing of the two storage and handling units 16 and 160 from one another are factors in determining how much movement is required. The cartridge holding space 50 of the pass-through box 40 containing the desired cartridge 120 is preferably positioned in a predetermined cartridge exchange position in the upper unit 160. At the exchange position, the cartridge 120 in the pass-through box 40 is accessible by the robotic cartridge shuttle 180 in the upper storage and handling apparatus 160.

In embodiments having a pass-through box with two or more cartridge spaces, the pass-through box is lifted to position all of the cartridge spaces in the upper storage and handling apparatus. This enables two or more cartridges to be passed with a single lifting of the pass-through box.

Figure 22:
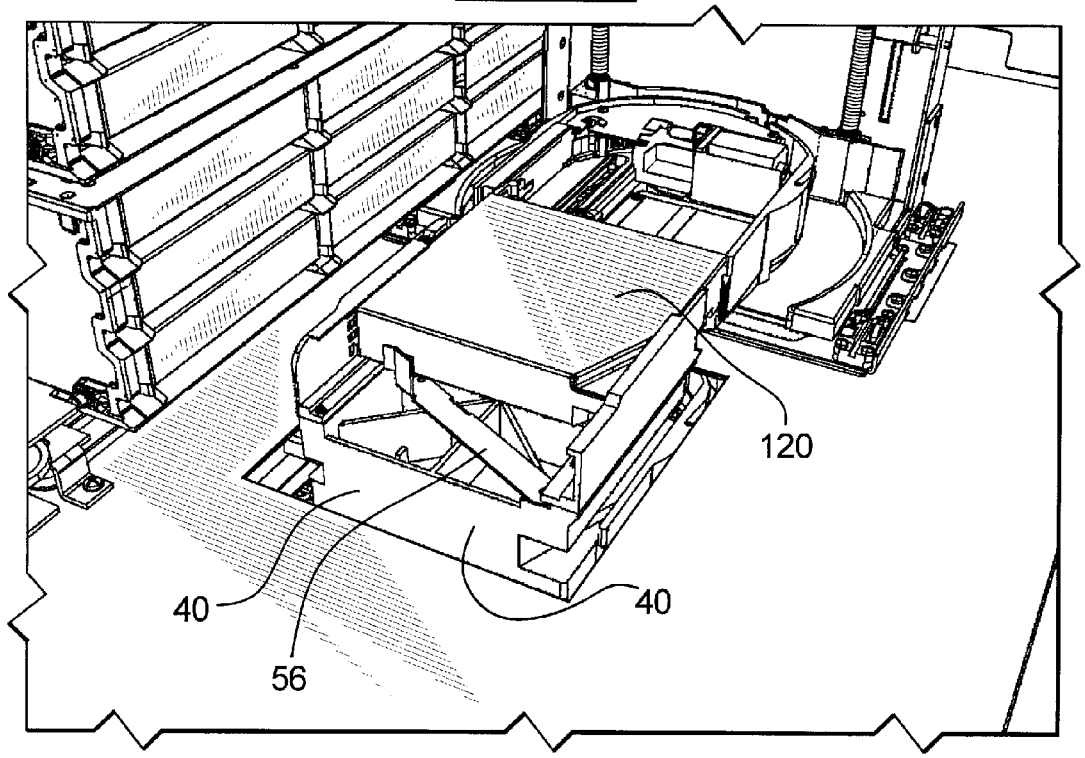
FIG. 22 is a top perspective view of the robotic cartridge shuttle of FIG. 21 showing the cartridge being transferred from the pass-through box to the cartridge shuttle of the upper cartridge storage and handling apparatus.

As shown in FIG. 22, the cartridge shuttle 180 in the upper storage and handling apparatus 160 is operated to move the cartridge gripper 194 thereof at a position at the upper compartment 50 of the pass-through box. The shuttle 180 is operated to release the latch 58 holding the cartridge 120 in the pass-through box 40, for example by moving the latch to the left. The release of the latch 58 results in the cartridge 120 being pushed to extend from the pass-through box 40 by the action of the spring loaded cartridge eject arm 56. With the cartridge 120 extending partially from the pass-through box 40 as seen in FIG. 22, the gripper portion 194 of the shuttle 180 grasps the cartridge 120 using the notches 122 at the sides of the cartridge. The gripper 194 withdraws the cartridge 120 from the pass-through box 40 and onto a rotation portion 196 of the shuttle 180.

For a multi-cartridge pass-through box, the upper shuttle may return and grasp another cartridge that has been lifted into the upper storage and handling device in the pass-through box. This continues until all cartridges are emptied from the multi-cartridge pass-through box.

The cartridge 120 is now in the control of the shuttle 180 of the upper storage and handling unit 160. The shuttle 28 of the lower unit 16 may be operated to lower the elevator portion 190 so that the pass-through box 40 is no longer extending into the upper unit 160. If desired, the lower shuttle 28 is operated to rotate the pass-through box 40 and return the pass-through box 40 to the pass-through box storage space 90 in the storage magazine 80. The shuttle 28 in the lower unit 16 is then available to access cartridges in the storage magazines, 80 for example, in the lower unit, move the cartridges from the storage magazine 80 to a read/write device 30, or to engage another cartridge for pass-through, insert it into the pass-through box and repeat the steps just described. It is also possible that the pass-through box 40 may be left in position extending into the upper storage and handling unit 160 so that it may receive a cartridge from the shuttle 180 of the upper unit 160, as will be described later.

Figure 23:
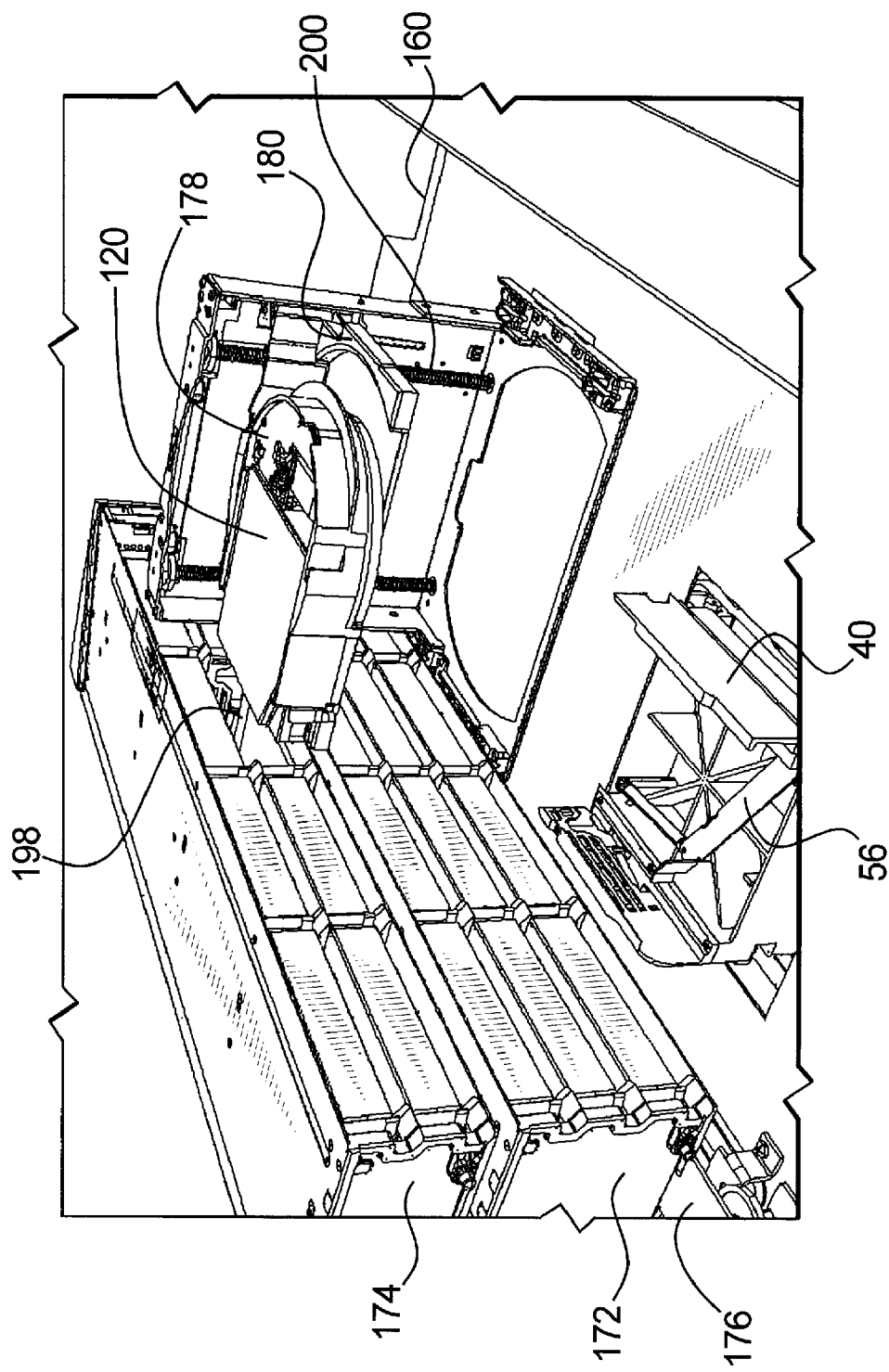
FIG. 23 is a perspective view of the robotic cartridge shuttle of the upper cartridge storage and handling apparatus moving the cartridge to a slot in the storage magazine.

In FIG. 23, the cartridge shuttle 180 of the upper storage and handling unit 160 moves to position the cartridge 120 it has received from the lower unit 16 via the pass-through box 40 to any desired location. For example, the upper shuttle 180 may position the cartridge 120 to a storage slot 198 in the storage magazine 174 where the cartridge is to be stored. The traverse drive 176 of the shuttle 180, an elevator portion 200 of the shuttle 180 and the rotator 196 of the shuttle 180 are moved as needed to achieve the alignment of the cartridge 120 with its new storage slot 198. The gripper 194 of the upper shuttle 180 moves the cartridge 120 toward the storage slot 198 and presses it in place, overcoming the spring force of the eject spring in the slot and moving the cartridge until the latch 84 on the storage slot snaps into engagement with the notch 122 on the cartridge 120. The cartridge shuttle 180 may then move on to other tasks.

Alternately, the shuttle 180 of the upper unit 160 may move the just-received cartridge 120 to a read/write drive in the upper unit so that data may be written to the cartridge or read from it. If the pass-through box 40 is in the way of the movement of the upper shuttle 180 to the read/write drive, as may be the case with the arrangement shown in FIG. 2, the lower shuttle 28 is operated to move the pass-through box 40 back down into the lower unit 16 and out of the way of the shuttle 180 in the upper unit 160.

The present apparatus and method may be utilized for passing a cartridge upward to a third storage and handling unit disposed above the upper unit, for example from the unit 14 in FIG. 1, through unit 12 and to unit 10. To accomplish this, the cartridge is passed from the lower unit 14 to the middle unit 12 in the manner described above. When the cartridge of interest has been received by the shuttle of the middle unit 12, the shuttle places the cartridge into the cartridge space of a pass-through box in the middle unit. The shuttle of the middle unit 12 then grips the pass-through box of the middle unit and positions it for movement through a pass-through opening in the top of the middle unit 12 so that the top compartment of the pass-through box is lifted into the upper unit 10. With the cartridge of interest in the upper unit 10, the shuttle of the upper unit 10 unlatches the cartridge and removes it from the pass-through box of the middle unit 12, whereafter the shuttle of the upper unit 10 may store or move the cartridge as desired.

As is apparent, the steps of passing the cartridge upward via pass-through boxes may be continued to other, further storage and handling units above the third unit. There is no physical limit on the number of units that can be connected in this way.

The method for moving a cartridge from one storage and handling unit to an adjacent unit in a downward direction is in many ways similar, with a few small differences. With reference to FIG. 1, beginning in the upper storage and handling unit 10, the robotic shuttle is moved to the cartridge slot in the storage magazine that holds the cartridge of interest. The gripper of the shuttle is used to release the latch on the cartridge slot and the gripper grasps the partially ejected cartridge that has been pushed outward by the eject spring. The gripper moves the cartridge of interest to the rotator of the shuttle and the shuttle moves to a position in the upper unit 10 adjacent the pass-through opening in the bottom of the upper unit 10.

The next lower storage and handling unit 12, which is the unit immediately below the storage and handling unit 10 that has just engaged the cartridge of interest in its shuttle, is operated so that the shuttle of the unit 12 grasps the pass-through box of the unit 12 and moves the pass-through box 40 to position the cartridge holding space of the pass-through box to thereby extend upward from the lower unit into the upper unit. The movement of the pass-through box 40 into the pass-through position may be performed prior to the upper shuttle engaging the cartridge, after the upper shuttle engages the cartridge, or simultaneously therewith. The gripper on the shuttle of the upper storage and handling apparatus 10 pushes the cartridge into the cartridge space of the pass-through box and presses it in until the cartridge is latched by the latch of the pass-through box 40. The latch engages the cartridge by engagement with a notch on the cartridge so that the cartridge is latched into the pass-through box 40. The shuttle of the upper unit 10 may then move away from the pass-through opening or perform other tasks within the upper storage and handling unit.

The next lower storage and handling apparatus 12 now has the cartridge of interest in the pass-through box 40, although the pass-through box 40 is still extending into the upper unit through the pass-through opening 10. The shuttle of the next lower storage and handling apparatus 12 lowers the elevator portion to being the pass-through box 40 entirely into the unit 12. The shuttle is moved in the traverse direction, if necessary, to bring the pass-through box 40 to the pass-through box storage space in the storage magazine in the next lower unit 12. The shuttle rotates, here by 90 degrees, and adjusts the height of the pass-through box as needed. The pass-through box 40 is inserted into the pass-through box space of the magazine 80 until it is latched in position by the latch of the storage magazine fitting into the notch in the pass-through box 40. The shuttle elevator portion then moves upward until it reaches the upper portion of the pass-through box where the shuttle is operated to release the cartridge from the latch of the pass-through box 40 so that the cartridge is pushed outward by the eject arm. The gripper grasps the cartridge by engaging the gripping notches in the cartridge and removes the cartridge from the pass-through box 40. The cartridge is then pulled into position at the rotator of the shuttle.

The shuttle of the unit 12 is moved translationally and vertically as necessary to position the cartridge at a storage slot in the storage magazine in the next lower storage and handling apparatus 12. The gripper portion of the shuttle pushes the cartridge into the slot of the storage magazine until latched.

Alternatively, the cartridge of interest may be inserted into a read/write drive in the next lower unit 12. Thus, both the upper and next lower units 10 and 12 of a pair of storage and handling units connected according to the present invention may have one or more read/write drives each, or only one of the units may have the read/write drive and so that the other serves as a storage overflow or expanded storage resource. In combined systems having a read/write drive in each unit, the data reading or writing rate may be increased with the present invention, since one read/write drive can be prepared for reading and/or writing by being provided with a cartridge while the other drive is working. Thus, down time waiting for cartridges to be exchanged with the drive is eliminated.

The multi-cartridge pass-through box is also used to pass down multiple cartridges at a time. For instance, in an embodiment having two cartridge spaces in the pass-through box, the pass-through box is lifted into the upper storage and handling apparatus and two cartridges from the upper storage and handling apparatus are inserted into the pass-through box. The box is lowered and the cartridges removed from the pass-through box. The same principles apply to pass-through boxes having three or more cartridge spaces.

If the cartridge of interest is to be transferred further downward (in the case of more than two storage and handling units connected together), the steps described above are followed to move the cartridge in question from the top unit 10 to the second unit 12, see FIG. 1. The cartridge is then moved from the pass-through box of the second unit 12 to the pass-through box of the third unit 14 and so on until the cartridge reaches the desired storage and handling unit. The details of the steps being performed will be apparent from a review of the foregoing description.

According to one aspect of the present invention, the combined system may be separated into two or more stand alone systems without significant expense or trouble. So long as each unit has a read/write drive, the units may simply be used separately. Since the pass-through openings would not be used in a stand alone mode, the covers are preferably put back over the openings. The storage magazine with the pass-through box in it may be left in the storage and handling unit or may be removed and replaced with a magazine without the pass-through box. The control connections of the units to one another are preferably removed. One or more of the units may be removed from the rack or not, as needed. Not all the units need be removed or separated from the combined system, but only as many as needed to achieve the desired size. The mounting guides may be removed from the rack if desired.

Thus, there is shown and described a method and apparatus for connecting data cartridge storage and handling units to one another for expanding the capacity of the data storage system. The expansion of the system utilizes the existing storage and handling apparatus and requires only simple modifications to be made to add one or more further storage and handling units for the expanded system. If the expanded system is to be downsized, the parts of the downsized system can be used in their reduced capacity by implementing simple measures.

Although other modifications and changes may be suggested by those skilled in the art, it is the intention of the inventors to embody within the patent warranted hereon all changes and modifications as reasonably and properly come within the scope of their contribution to the art.

We claim:

1. A data cartridge handling and storage system, comprising:
    a first data storage and handling apparatus including:
        a first housing, said first housing defining a first pass through opening of a size to pass at least one data cartridge;
        at least one storage magazine in said first housing;
        a first cartridge shuttle in said first housing, said first cartridge shuttle being operable to move data cartridges between said at least one storage magazine and said first pass through opening;
    a second data storage and handling apparatus including:
        a second housing, said second housing defining a second pass through opening of a size to pass at least one data cartridge, said second pass through opening being disposed in a position substantially in registration with said first pass through opening when said first housing and second housing are disposed adjacent on another;
        at least one storage magazine in said second housing;
        a second cartridge shuttle in said second housing, said second cartridge shuttle being operable to move data cartridges between said at least one storage magazine and said second pass through opening, said first and second cartridge shuttles being operable to pass at least one data cartridge from said first data cartridge shuttle to said second data cartridge shuttle through said first and second pass through openings when said first and second pass through openings are substantially in registration so as to transfer a data cartridge from said first data storage and handling apparatus to said second data storage and handling apparatus;
    at least one data cartridge read/write drive in at least one of said first and second housings; and
    a pass-through box in at least one of said first and second data storage and handling apparatus, said pass-through box including a first portion configured for acceptance in a corresponding one of said first and second cartridge shuttles and a second portion configured for holding at least one data cartridge so that the at least one data cartridge in said second portion is movable between said first and second data storage and handling apparatus by operation of said corresponding one of said first and second cartridge shuttles.

2. A data cartridge handling and storage system as claimed in claim 1, wherein said at least one data cartridge read/write drive includes at least one read/write drive in each of said first and second housings.

3. A data cartridge handling and storage system as claimed in claim 1, wherein said first pass through opening is at a top surface of the first housing, and wherein said second pass through opening is at a bottom surface of said second housing, said first cartridge shuttle being operable to extend at least said second portion of said pass-through box upward through said first and second pass through openings to position at least one data cartridge in said second portion of said pass-through box into said second housing for engagement by said second cartridge shuttle when said first and second pass through openings are substantially in registration.

4. A data cartridge handling and storage system as claimed in claim 1, wherein said storage magazine of said corresponding one of said data storage and handling apparatus defines a pass-through box storage opening for storing said pass-through box.

5. A data cartridge handling and storage system as claimed in claim 1, wherein said first and second data storage and handling apparatus is configured for mounting on a rack, and further comprising: a spacing indication apparatus having indications for indicating a spacing of said first and second storage and handling apparatus from one another when mounted on said rack.

6. A data cartridge handling and storage system as claimed in claim 1, further comprising: a controller connected to each of said first and second data storage and handling apparatus, said controller being operable to coordinate operations of said first and second cartridge shuttles.

7. A data cartridge handling and storage system as claimed in claim 1, further comprising:
    a third storage and handling apparatus mounted in a vertical arrangement with said first and second storage and handling apparatus, said third storage and handling apparatus including:
        a third housing defining a pass-through opening, said pass-through opening of said third housing being disposed in registration with said pass-through opening of one of said first and second storage and handling apparatus;
        at least one storage magazine in said third housing; and
        a third cartridge shuttle in said third housing operable to move data cartridges between said at least one storage magazine in said third housing and said pass-through box.

8. A data cartridge handling and storage system, comprising:
    a first data storage and handling apparatus including:
        a first storage magazine in said first data storage and handling apparatus, said first storage magazine defining storage slots for holding a plurality of data cartridges;
        a first cartridge shuttle in said first data storage and handling apparatus, said first cartridge shuttle being operable to remove data cartridges from said first storage magazine;

a second data storage and handling apparatus including:
  a second storage magazine in said second data storage and handling apparatus, said second storage magazine defining storage slots for holding a plurality of data cartridges;
  a second cartridge shuttle in said second data storage and handling apparatus, said second cartridge shuttle being operable to move data cartridges to said second storage magazine, said first and second cartridge shuttles being operable to pass a data cartridge from said first data cartridge shuttle to said second data cartridge shuttle;
at least one data cartridge read/write drive in at least one of said first and second storage and handling apparatus; and
a pass-through box in at least one of said first and second data storage and handling apparatus, said pass-through box including a first portion configured for acceptance in a corresponding one of said first and second cartridge shuttles and a second portion configured for holding at least one data cartridge so that the at least one data cartridge in said second portion is movable between said first and second data storage and handling apparatus by operation of said corresponding one of said first and second cartridge shuttles.

9. A data cartridge handling and storage system as claimed in claim 8, further comprising:
  a first housing enclosing said first data storage and handling apparatus, said first housing defining a first pass-through opening;
  a second housing enclosing said second data storage and handling apparatus, said second housing defining a second pass-through opening;
  a mounting rack on which said first and second housings are mounted so that said first and second pass-through openings are in registration; and
  a mounting guide on said mounting rack and having indicia to indicate a spacing for mounting said first and second housings relative to one another.

10. A data cartridge handling and storage system as claimed in claim 9, wherein said mounting guide includes at least one elongated tape defining holes at a predetermined spacing from one another for guiding the mounting of said first and second housings relative to one another.

11. A data cartridge handling and storage system as claimed in claim 8, wherein said pass-through box includes:
  a cartridge-shaped portion as a lower part, said cartridge-shaped portion including at least one notch for at least one of latching and gripping,
  said pass-through box including a cartridge holder spaced from said cartridge-shaped portion, said cartridge holder being shaped to hold at least one data cartridge;
  an eject arm mounted in said cartridge holder of said pass-through box and biased to push a data cartridge to an eject position;
  a latch at said cartridge holder, said latch being operable to engage a data cartridge in said cartridge holder; and
  an extension portion between said cartridge-shaped portion and said cartridge holder.

12. A data cartridge handling and storage system as claimed in claim 8, wherein said system is operable in a first mode of operation to move a data cartridge from said first data storage and handling apparatus to said second data storage and handling apparatus and said system is operable in a second mode of operation to move a data cartridge from said second data storage and handling apparatus to said first data storage and handling apparatus.

13. A method for expanding data storage capacity of a data storage system, comprising the steps of:
  providing a first data cartridge storage and handling unit having a first housing, said first housing defining a first pass-through opening, a first removable cover over said first pass-through opening;
  providing a second data cartridge storage and handling unit having a second housing, said second housing defining a second pass-through opening, a second removable cover over said second pass-through opening;
  providing an indicating apparatus for indicating a spacing for mounting said first and second data cartridge storage and handling units relative to one another on a mounting rack;
  providing a pass-through box having a cartridge holder and a cartridge shaped part spaced from said cartridge holder; and
  providing a control for coordinating operation of said first and second data cartridge storage and handling units to provide pass through of at least one data cartridge from said first data cartridge storage and handling unit to said second data cartridge storage and handling unit using said pass-through box via said first and second pass-through openings.

14. A method for expanding data storage capacity of a data storage system, comprising the steps of:
  opening a first pass-through opening in a first housing of a first cartridge storage and handling unit;
  mounting said first cartridge storage and handling unit on a rack;
  opening a second pass-through opening in a second housing of a second cartridge storage and handling unit;
  mounting said second cartridge storage and handling unit on said rack at a predetermined position relative to said first cartridge storage and handling unit, said first and second cartridge storage and handling units being mounted with said first and second pass-through openings in registration;
  replacing a storage magazine in said first cartridge storage and handling unit with a replacement storage magazine having a pass-through box; and
  connecting said first and second cartridge storage and handling units to one another for coordinated operation.

15. A method as claimed in claim 14, wherein said step of mounting is performed by use of a mounting guide affixed to said rack.

16. A method of combining operation of two cartridge storage and handling units, comprising the steps of:
  determining a storage location of at least one cartridge of interest, said determining step including determining that the at least one cartridge of interest is stored at a storage location in a first storage and handling unit;
  moving the at least one cartridge of interest from the storage location to a cartridge space of a pass-through box;
  extending the pass-through box between the first storage and handling unit and a second storage and handling unit; and
  moving the at least one cartridge of interest from the pass-through box to a storage location in said second storage and handling unit.

17. A method as claimed in claim 16, wherein said step of moving the at least one cartridge of interest to the cartridge space of the pass-through box is performed while the pass-through box is entirely within the first storage and handling unit.

18. A method as claimed in claim 16, wherein said step of moving the at least one cartridge of interest to the cartridge space of the pass-through box is performed while the pass-through box is extending between the first storage and handling unit and a second storage and handling unit.

19. A method as claimed in claim 16, wherein said step of extending the pass-through box between the first storage and handling unit and a second storage and handling unit is performed while the pass-through box is holding the at least one cartridge of interest.

20. A method as claimed in claim 16, wherein said step of extending the pass-through box between the first storage and handling unit and a second storage and handling unit is performed without the at least one cartridge of interest in the pass-through box; and further comprising the step of:

retracting the pass-through box from a position extending between the first storage and handling unit and a second storage and handling unit while the pass-through box is holding the at least one cartridge of interest.

* * * * *